US012784324B2

(12) United States Patent
Zhu

(10) Patent No.: US 12,784,324 B2
(45) Date of Patent: Nov. 3, 2026

(54) TERRAIN IMAGE RENDERING METHODS AND SYSTEMS

(71) Applicant: Tencent Technology (Shenzhen) Company Limited, Shenzhen (CN)

(72) Inventor: Hongchuan Zhu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 113 days.

(21) Appl. No.: 18/795,404

(22) Filed: Aug. 6, 2024

(65) Prior Publication Data

US 2024/0394954 A1 Nov. 28, 2024

Related U.S. Application Data

(63) Continuation of application No. PCT/CN2023/084552, filed on Mar. 29, 2023.

(30) Foreign Application Priority Data

May 30, 2022 (CN) ......................... 202210596593.7

(51) Int. Cl.
*G06T 17/05* (2011.01)
*G06T 5/50* (2006.01)
(Continued)

(52) U.S. Cl.
CPC ................ *G06T 15/04* (2013.01); *G06T 5/50* (2013.01); *G06T 7/20* (2013.01); *G06T 2207/20221* (2013.01)

(58) Field of Classification Search
CPC ...... G06T 15/04; G06T 2210/36; G06T 17/05
(Continued)

(56) References Cited

U.S. PATENT DOCUMENTS

2005/0088450 A1* 4/2005 Chalfin ................... G06T 15/04 345/587
2005/0253843 A1 11/2005 Losasso Petterson et al.
(Continued)

FOREIGN PATENT DOCUMENTS

CN 101261743 A 9/2008
CN 104484896 A 4/2015
(Continued)

OTHER PUBLICATIONS

Jul. 1, 2002—Office Action—App No. 2022105965937.
(Continued)

*Primary Examiner* — Samantha (Yuehan) Wang
(74) *Attorney, Agent, or Firm* — Banner & Witcoff, Ltd.

(57) ABSTRACT

This application provides a terrain image rendering method, apparatus, and computer-readable storage medium. The method includes: determining a target level for a refreshing of the terrain image and surface range information for the refreshing of the terrain image; obtaining, from a pre-generated image set, a level area image corresponding to the target level; updating, based on the surface range information, the level area image corresponding to the target level to obtain an updated level area image corresponding to the target level; updating, based on the updated level area image, the pre-generated image set to obtain an updated image set; determining, based on the updated image set, rendering information of each pixel point in a visual range; and rendering the terrain image in the visual range based on the rendering information of each pixel point in the visual range.

17 Claims, 9 Drawing Sheets

1401

1402

(51) Int. Cl.
*G06T 7/20* (2017.01)
*G06T 15/04* (2011.01)

(58) Field of Classification Search
USPC .......................................................... 345/582
See application file for complete search history.

(56) References Cited

U.S. PATENT DOCUMENTS

| | | | | |
|---|---|---|---|---|
| 2007/0171234 | A1 | 7/2007 | Crawfis et al. | |
| 2014/0152664 | A1* | 6/2014 | Le Meur ................. | G06T 17/05 345/428 |
| 2017/0200301 | A1* | 7/2017 | Boissé ..................... | G06T 17/05 |
| 2022/0051481 | A1* | 2/2022 | Laine ...................... | G06T 17/00 |

FOREIGN PATENT DOCUMENTS

| | | | |
|---|---|---|---|
| CN | 109949693 | A | 6/2019 |
| CN | 114677467 | A | 6/2022 |

OTHER PUBLICATIONS

Jul. 7, 2022—Office Action—App No. 202210596593.7.
Jul. 5, 2023—(PCT) International Search Report and Written Opinion—PCT/CN2023/084552.
Bai, H. et al. “Large scale terrain rendering based on clipmap,” Chinese Journal of Stereology and Image Analysis, vol. 14, No. 2, pp. 202-207, Jun. 2009.

* cited by examiner

TERRAIN IMAGE RENDERING METHODS AND SYSTEMS

CROSS REFERENCE TO RELATED APPLICATIONS

This application is a continuation application of PCT Application PCT/CN2023/084552, filed Mar. 29, 2023, which claims priority to Chinese Patent Application No. 202210596593.7 filed on May 30, 2022, each entitled "METHOD AND APPARATUS FOR RENDERING TERRAIN IMAGE, DEVICE, COMPUTER-READABLE STORAGE MEDIUM, AND COMPUTER PROGRAM PRODUCT", and both of which are incorporated herein by reference in their entirety.

FIELD

This application relates to the field of computer technologies, and in particular, to terrain image rendering methods and systems.

BACKGROUND

In a game based on a three-dimensional virtual environment, a three-dimensional model of a virtual terrain needs to be rendered, so that a terrain picture is generated and displayed. A terrain is a main geometric model in a view, and a quantity of triangular faces that need to be rendered accounts for a large proportion in an entire view. Therefore, real-time performance, that is, fluency of roaming, has great impact on an inter-frame rate, human-computer interactivity, and immersion of an entire view system.

SUMMARY

One or more aspects of this application provide a terrain image rendering method, apparatus, device, computer-readable storage medium, and computer program product. Rendering efficiency of a surface image is improved.

Technical solutions in the one or more aspects of this application include but are not limited to those discussed below.

One or more aspects of this application provide a method comprising:

- determining, by a computing device and in response to a determination that a refresh timing of a terrain image in a virtual scene is reached, a target level for a refreshing of the terrain image and surface range information for the refreshing of the terrain image;
- obtaining, by the computing device and from a pre-generated image set, a level area image corresponding to the target level, the pre-generated image set comprising at least two map images, and each map image comprising a plurality of level area images that are generated using a clip map rendering process and that are of different levels of detail;
- updating, by the computing device and based on the surface range information, the level area image corresponding to the target level to obtain an updated level area image corresponding to the target level;
- updating, by the computing device and based on the updated level area image, the pre-generated image set to obtain an updated image set;
- determining, by the computing device and based on the updated image set, rendering information of each pixel point in a visual range; and
- rendering, by the computing device, the terrain image in the visual range based on the rendering information of each pixel point in the visual range.

One or more aspects of this application provide an apparatus for rendering a terrain image, including:

- a first determining module, configured to determine, when determining that refresh timing of a terrain image is reached, a to-be-refreshed target level and surface range information that needs to be refreshed;
- a first obtaining module, configured to obtain map images corresponding to the target level respectively from a pre-generated image set, the image set including at least two map images, the map image including a plurality of level of detail pictures that are generated using a clipmap rendering process and that are of different distances;
- a first updating module, configured to update the map image corresponding to the target level based on the surface range information, to obtain an updated map image, and update the image set based on the updated map image, to obtain an updated image set;
- a second determining module, configured to determine rendering information of each pixel point in a visual range based on the updated image set; and
- a first rendering module, configured to render a terrain image in the visual range based on the rendering information of each pixel point.

One or more aspects of this application provide a computer device, including:

- a memory, configured to store executable instructions; and
- a processor, configured to implement the method for rendering a terrain image provided in the one or more aspects of this application when executing the executable instructions stored in the memory.

One or more aspects of this application provide a computer-readable storage medium, having executable instructions stored therein, the computer-executable instructions, when executed by a processor, configured for causing to implement the method for rendering a terrain image provided in the one or more aspects of this application.

One or more aspects of this application provide a computer program product, including a computer program or instructions, and the computer program or the instructions, when executed by a processor, implementing the method for rendering a terrain image provided in the one or more aspects of this application.

The one or more aspects of this application include but are not limited to the following beneficial effects.

When it is determined that refresh timing of a terrain image is determined, a to-be-refreshed target level and surface range information that needs to be refreshed are first determined, the surface range information that needs to be refreshed being less than a coverage range corresponding to the to-be-refreshed target level. Then, a map image corresponding to the target level is obtained from a pre-generated image set, the image set including at least two map images, the map image including a plurality of level of detail pictures that are generated using a clipmap rendering process and that are of different distances. In addition, the map image corresponding to the target level is updated based on the surface range information, to obtain an updated map image. The image set is updated based on the updated map image, to obtain an updated image set. Finally, rendering information of each pixel point in a visual range is determined based on the updated image set, and a terrain image in the visual range is rendered based on the rendering information of each pixel point. Because a plurality of level of detail pictures of different distances are generated by pre-blending a plurality of layers of map images using a clipmap rendering process, and the level of detail pictures are combined into a large map image, a real-time process of blending and baking during rendering is omitted. In addition, when refreshing is required, only a part of a surface range in a coverage range corresponding to the target level is updated, thereby improving terrain rendering performance and efficiency.

DETAILED DESCRIPTION

To make objectives, technical solutions, and advantages of this application clearer, the following further describes this application in detail with accompanying drawings. The described aspects do not need to be construed as limitation on this application. All other aspects obtained by a person of ordinary skill in the art based on the one or more aspects of this application without creative efforts shall fall within the protection scope of this application.

"Some aspects" involved in the following description describes a subset of all possible aspects. However, "some aspects" may be same or different subsets of all the possible aspects, and may be combined with each other when there is no conflict.

In the following description, the terms "first", "second", and "third" are merely intended to distinguish between similar objects and do not indicate a specific sequence of the objects. A specific order or sequence of the "first", "second", and "third" may be interchanged if permitted, so that the one or more aspects of this application described herein may be implemented in a sequence other than the sequence illustrated or described herein.

Unless otherwise defined, meanings of all technical and scientific terms used in this specification are the same as those usually understood by a person skilled in the art to which this application belongs. Terms used in this specification are merely intended to describe objectives of the one or more aspects of this application, but are not intended to limit this application.

Before the one or more aspects of this application are further described in detail, terms involved in the one or more aspects of this application are described, and the following explanations are applicable to the terms involved in the one or more aspects of this application.

Figure 1A:
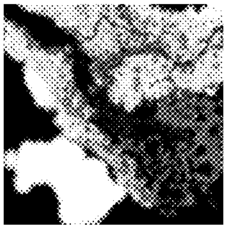
FIG. 1A is a schematic diagram of an example of a splat map.

(1) Splat map: In a terrain, a texture may be grass, dirt, rock, snow, or another type. There may be a plurality of channels in the texture, that is, red, green, blue, and semi-transparent. Different channels may be used to store blending weights of different terrain types, to obtain some grass and dirt interlacing effects through fusion. FIG. 1A is an example illustration of a splat map.

Figure 1B:
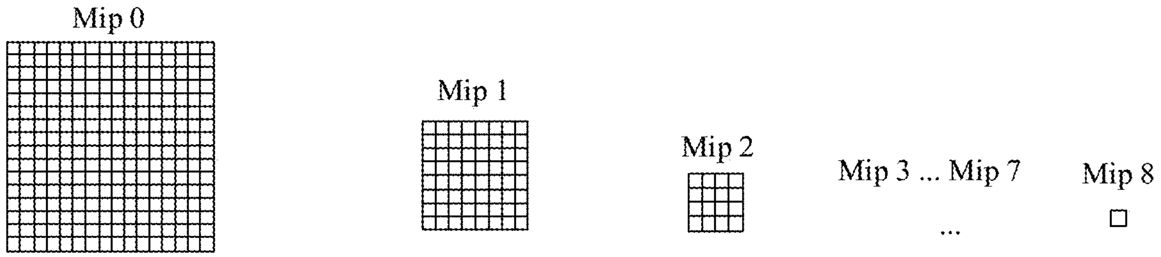
FIG. 1B is a schematic diagram of eight levels of an example of a mip map.

(2) Mip map: To accelerate a rendering speed and reduce image aliasing, a map may be processed into a file including a series of pre-calculated and optimized pictures. The map is referred to as the mip map. A mini image at each level of the mip map is detail-reduced duplication at a specific scale of a main image. If a basic size of the map is 256*256 pixels, as shown in FIG. 1B, the mip map may have eight levels. Each level may be a quarter of a previous level, and sizes of the levels may be 128*128, 64*64, 32*32, 16*16, 8*8, 4*4, 2*2, and 1*1 (one pixel) in sequence.

Because the mip map needs fewer pixels to be read than an ordinary map, the rendering speed is improved. In addition, operation time is reduced. Because pictures of the mip map are anti-aliased, the burden of real-time rendering is reduced. However, sub maps of an original map at several levels need to be pre-generated for use of the mip map. This may cause additional space occupation (for example, about 33%).

(3) Level of detail (LOD): It refers to determining a resource allocation for object rendering based on a position and importance of a node of an object model in a display environment, to reduce a quantity of faces and a degree of detail of a non-important (e.g., secondary) object. Therefore, an efficient rendering operation is obtained.

Figure 1C:
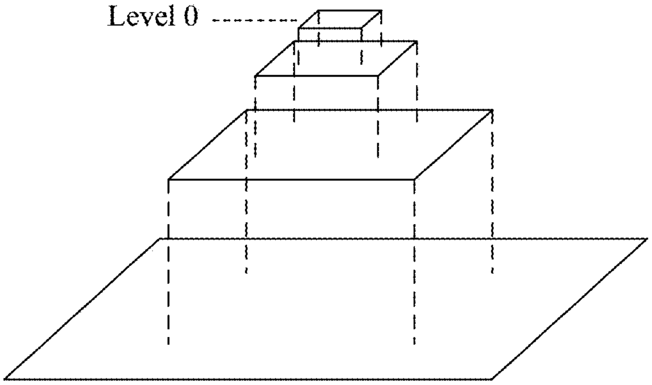
FIG. 1C is a schematic diagram of each level of an example of a clipmap.

(4) Clipmap: An idea of the clipmap originates from a mip map, and the idea may be effectively applied to terrain LOD and clipping of extremely large height map data. An effect of the clipmap is to render larger space by using as little memory as possible. As shown in FIG. 1C, a plurality of layers of data with a large resolution may be used. Each level may cover a range of the space. A higher level cover a larger range, and a size of each level may be twice the size of a previous level. The data may be a mip map or another data.

(5) Draw call: It is an operation in which a central processing unit (CPU) invokes a graphics programming interface to command a graphics processing unit (GPU) to perform rendering. Before invoking the draw call each time, the CPU needs to send a lot of content to the GPU, including data, a status, a command, and the like. If a quantity of draw calls is large, the CPU is overloaded. A typical optimization method is to reduce the quantity of draw calls by batching.

(6) Texture sample: The texture sample is a function of obtaining a corresponding map image according to one or more set rules (a filter mode, an addressing mode, a max anisotropy, and/or the like).

Generally, the texture sample is a high part of a rendering process for performance and power consumption, and is one of data indicators that need to be focused on when the performance is optimized.

(7) UV coordinates: At each point on a mesh surface, texture mapping coordinates may be obtained, and the texture mapping coordinates may define a two-dimensional position corresponding to a three-dimensional position in a texture map. Generally, a variable (u, v) is assigned to coordinates, where u is a horizontal coordinate, and v is a vertical coordinate. Therefore, the texture mapping coordinates are also abbreviated as the UV coordinates.

(8) Virtual texture (VT): Many games expect a huge map to represent a delicate texture, for example, a terrain surface texture in a large first-person shooting game (FPS). A map range is huge, and resources needed are massive. If the map image is directly read into the memory, this is clearly unrealistic. Therefore, a concept of the virtual texture is provided. A large texture is not loaded into the memory, but a needed part of the texture is loaded based on an actual requirement. This mechanism reduces bandwidth consumption and memory (display) consumption, in addition, brings other benefits, such as facilitating batching.

Figure 1D:
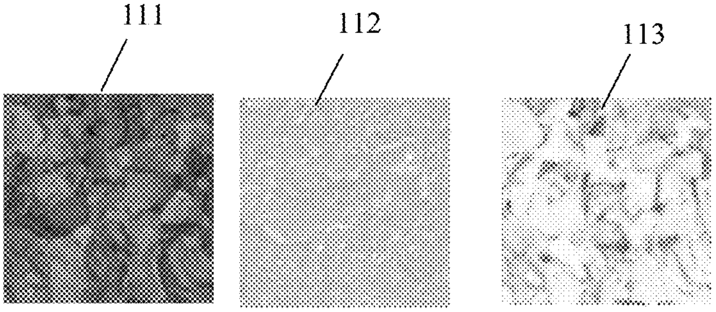
FIG. 1D is a schematic diagram of an example of a material texture.

(9) Physically based rendering (PBR): It is a coloring and rendering technology configured for more accurately describing how light interacts with a surface of an object. Because of high ease of use and convenient workflow of, the physically based rendering is widely used in films and game industries. An advantage of the PBR is that effects in various lighting environments through an accurate physical calculation formula can be accurately obtained through the PBR, and a uniform workflow for different 3D designers is provided. A material part defines a material surface attribute by using a basic color, a normal, a highlight, a roughness, and a metal degree. Because there are many attributes, three maps shown in FIG. 1D are generally used to store different attributes respectively, where 111 represents the basic color attribute, 112 represents the normal attribute, and 113 represents the highlight attribute, the roughness attribute, and the metal attribute.

To better understand a method for rendering a terrain image provided in the one or more aspects of this application, the method for rendering the terrain image in the related art and disadvantages thereof are first described.

1. A Solution in which the Splat Map is Used to Control Mixing of a Plurality of Layers of Surface Maps.

To obtain a richer surface effect, four levels of textures may be blended by using the splat map to generate a final color. Currently, mainstream commercial game engines all use this solution, for example, unity and unreal engine. A benefit of this solution is that various rich terrain effects can be made by using few picture resources, and are supported by a large quantity of external tools.

2. A Texture Array is Sampled Through an ID Image.

During implementation, the ID image is generated, and then a corresponding surface map in a texture array T is sampled through the ID image.

3. An Adaptive Virtual Texture Solution.

Currently, a commonly used unity engine is not supported, and there are fewer known game applications. This solution further adds a concept of the LOD to the virtual texture. Therefore, a near position indicates higher precision and a far position indicates lower precision.

A solution in which the splat map is used to control mixing of the plurality of layers of surface maps has a benefit of high accuracy and good effect. A disadvantage is that when a quantity of blended levels is larger, the draw call and a quantity of texture samples both increase, and the performance is reduced. With current game production standards, a performance bottleneck easily occurs, and it is not possible to have some effects such as rock and surface fusion. Because it is difficult to predict how many levels of pictures currently need to be blended, it is difficult to obtain a surface effect on a model other than a terrain for implementation and performance reasons. In addition, different maps of different land-masses are also not beneficial to batching. Therefore, the performance is also affected.

A disadvantage of the solution in which the texture array is sampled through the ID image is that the ID image has a precision limitation. Therefore, there is an aliasing effect where different surface maps are switched after the corresponding surface map in the texture array is sampled. Although some of the problems may be resolved by sampling near pixel points for interpolation, the effect is not ideal. In addition, a situation of gradual mixing of the surface map, such as mixing of sand and the image cannot be solved well, the effect is difficult to satisfy the art, and the effect is different from effects generated by many surface generation tools.

In the adaptive virtual texture solution, UV coordinates of a sampling image set is needed to be switched through the ID image, so that sampling through the ID image is performed at least once more. Because the image set is divided into small segments, a quantity of invokes of the draw call during real-time refreshing of the image set is high. In addition, excessive segments are not conducive to scene clipping of the corresponding map or baking of a road model to the terrain. In addition, implementation is complex, and it is very difficult to be realized on the mobile phone.

The one or more aspects of this application provide a solution for rendering the surface in real-time with better performance, resolve the foregoing problem through efficient real-time pre-baking and a simplified VT solution, and support a scene model and a surface fusion effect.

One or more aspects of this application provide a method and an apparatus for rendering a terrain image, a device, and a computer-readable storage medium. This can improve rendering efficiency of the terrain image. The following describes exemplary applications of a computer device provided in the one or more aspects of this application. The device provided in the one or more aspects of this application may be implemented as various types of user terminals such as a notebook computer, a tablet computer, a desktop computer, a set-top box, a mobile device (for example, a mobile phone, a portable music player, a personal digital assistant, a dedicated message device, and a portable game device). The following describes an exemplary application when the device is implemented as a terminal.

Figure 2:
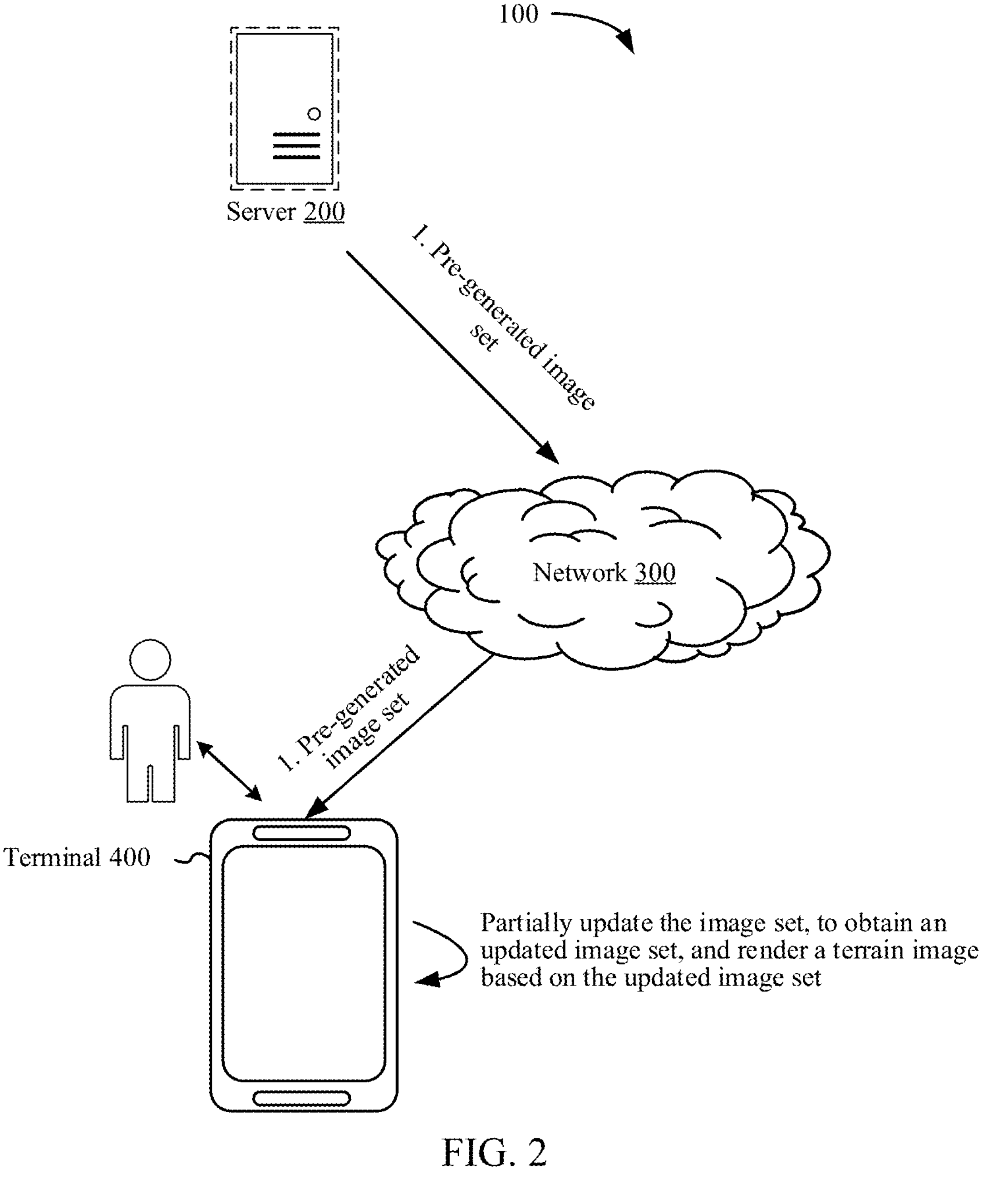
FIG. 2 is a schematic diagram of an example of a network structure of a rendering system according to one or more aspects of this application.

FIG. 2 is a schematic diagram of an example of a network architecture of a rendering system 100 according to one or more aspects of this application. As shown in FIG. 2, the network architecture may include a server 200, a network 300, and a terminal 400. The terminal 400 may be connected to the server 200 through the network 300. The network 300 may be a wide area network, or a local area network, or a combination of the wide area network and the local area network.

A client of an application may be installed in the terminal 400. The application may be an application that needs to be downloaded and installed, or may be a click-to-use application (a mini program). This is not limited in the one or more aspects of this application. In one example, the application may be any application that can provide a virtual environment for a virtual object substituted and operated by a user to perform an activity in the virtual environment. Typically, the application may be a game application, such as a massively multiplayer online role-playing (MMORP) game, a third-person shooting game (TPS), or a first-person shooting game (FPS). Certainly, in addition to the game application, the virtual object may be displayed to the user in another type of application, and a corresponding function may be provided to the virtual object. For example, a virtual reality (VR) application, an augmented reality (AR) application, a three-dimensional map program, an interactive entertainment application, and/or the like are not limited in the one or more aspects of this application. In addition, virtual objects provided by different applications may have different forms and corresponding different functions. This may be configured in advance based on an actual requirement. This is not limited in the one or more aspects of this application. In some instances, the application may be an application developed based on a three-dimensional virtual environment engine. For example, the virtual environment engine may be a unity engine. The virtual environment engine may construct a three-dimensional virtual environment, a virtual object, a virtual item, and the like, to bring a more immersive gaming experience to the user.

The foregoing virtual environment is a scene displayed (or provided) when the client of the application runs on the terminal 400. The virtual environment may be a scene created for the virtual object to perform an activity (for example, game arena), such as a virtual house, a virtual island, a virtual map, or a virtual building. The virtual environment may be a simulated environment of the real world, may be a semi-simulated and semi-fictional environment, or may be a purely fictional environment. The virtual environment may be a two-dimensional virtual scene, or a three-dimensional virtual environment. This is not limited in this application.

In one example, when a terrain image in a virtual scene needs to be rendered, the terminal 400 may obtain a pre-generated image set from the server 200. The image set may include at least two map images, and the map images may include a plurality of level of detail pictures that may be generated using a clipmap rendering process and that may be of different distances. Then, the terminal 400 may obtain a map image corresponding to a target level from the image set, update the map image corresponding to the target level based on surface range information to obtain an updated map image, update the image set based on the updated map image to obtain an updated image set, determine rendering information of each pixel point in a visual range based on the updated image set, and render a terrain image in the visual range based on the rendering information of each pixel point.

In some instances, the terminal 400 may further obtain height data and normal data of the virtual scene from the server 200, and then pre-generate a normal height map image in the image set based on the height data and the normal data. The normal data may be normalized data (for example, a normalized height map image, normalized data of the virtual scene, and the like). The terminal 400 may further obtain a plurality of layers of surface texture images from the server 200, and blend the plurality of layers of surface texture images using a clipmap rendering process to generate the level of detail pictures of different distances, and compose a color map image. In addition, the terminal 400 may also obtain a plurality of layers of material texture images from the server, and perform processing that is similar to processing of the surface texture image to generate material of level of detail pictures of different distances, and then compose the material of level of detail pictures of different distances into a material map image. Then, when rendering the terrain image, the terminal may determine a to-be-refreshed target level and surface range information that needs to be refreshed when determining that refresh timing of the terrain image is reached. The terminal may further, obtain a map image corresponding to the target level from the pre-generated image set, the image set including at least two map images, the map image including the plurality of level of detail pictures that are generated in the clipmap manner and that are of different distances. The terminal may further update the map image corresponding to the target level based on the surface range information to obtain the updated map image and update the image set based on the updated map image to obtain the updated image set. The terminal may further determine rendering information of each pixel point in the visual range based on the updated image set and render the terrain image in the visual range based on the rendering information of each pixel point. Because a plurality of level of detail pictures of different distances are generated by pre-blending a plurality of layers of map images using a clipmap rendering process, and the level of detail pictures are combined into a large map image, a real-time process of blending and baking during rendering is omitted. In addition, when refreshing is required, only a part of a surface range in a coverage range corresponding to the target level is updated, thereby improving terrain rendering performance and efficiency.

In some instances, the server 200 may be an independent physical server, or a server cluster or a distributed system composed of a plurality of physical servers, or may alternatively be a cloud server that provides a cloud service, a cloud database, cloud computing, a cloud function, cloud storage, a network service, cloud communication, a middleware service, a domain name service, a security service, a content delivery network (CDN), and a basic cloud computing service such as big data and an artificial intelligence platform. The terminal 400 may be a smartphone, a tablet, a laptop, a desktop computer, a smart speaker, a smart watch, and a vehicle-mounted smart terminal, but this is not limited. The terminal and the server may be connected directly or indirectly in a wired or wireless communication protocol. This is not limited in the one or more aspects of this application.

Figure 3:
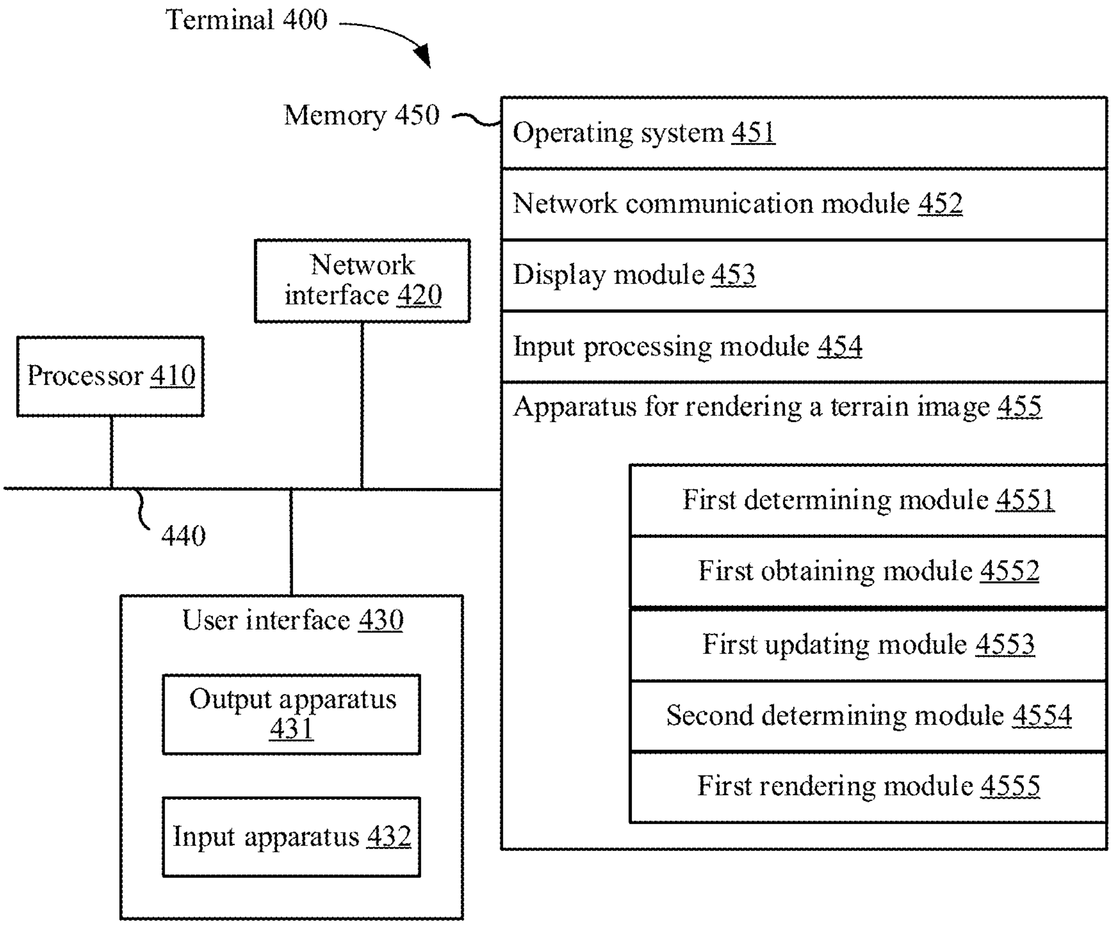
FIG. 3 is a schematic diagram of a structure of a terminal 400 according to one or more aspects of this application.

FIG. 3 is a schematic diagram of a structure of a terminal 400 according to one or more aspects of this application. The terminal 400 shown in FIG. 3 includes at least one processor 410, a memory 450, at least one network interface 420, and a user interface 430. All the components in the terminal 400 are coupled together by a bus system 440. The bus system 440 may be configured to implement connection and communication between the components. In addition to a data bus, the bus system 440 may further include a power bus, a control bus, and/or a status signal bus. However, for ease of clear description, all types of buses are marked as the bus system 440 in FIG. 3.

The processor 410 may be an integrated circuit chip having a signal processing ability, for example, a general processor, a digital signal processor (DSP), or another programmable logic device, a discrete gate or a transistor logic device, or a discrete hardware component, where the general processor may be a microprocessor, any conventional processor, or the like.

The user interface 430 may include one or more output apparatuses 431 that can display media content, including one or more speakers and/or one or more visual displays. The user interface 430 may also include one or more input apparatuses 432, including a user interface component that facilitate user input such as a keyboard, a mouse, a microphone, a touchscreen display screen, a camera, another input button, or a control.

The memory 450 may be a removable memory, a non-removable memory, or a combination of a removable memory and a non-removable memory. Exemplary hardware devices include a solid state memory, a hard drive, an optical disk drive, and/or the like. In some instances, the memory 450 includes one or more storage devices physically remote from the processor 410.

The memory 450 may be a volatile memory or a non-volatile memory, or may include both a volatile memory and a non-volatile memory. The non-volatile memory may be a read only memory (ROM), or the volatile memory may be a random access memory (RAM). The memory 450 described in the one or more aspects of this application is intended to include, but is not limited to, memories of any suitable type.

In some instances, the memory 450 may store data to support various operations. An example of the data includes a program, a module, a data structure, or a subset or a superset of the data. The following is an example.

An operating system 451 may include a system program configured to handle various basic system services and perform a hardware related task, for example, a framework layer, a core library layer, or a driver layer, used for implementing various basic services and processing a task based on hardware.

A network communication module 452 may be configured to reach another computing device through one or more (wired or wireless) network interfaces 420. Exemplary network interfaces 420 include Bluetooth, wireless fidelity (Wi-Fi), a universal serial bus (USB), and the like.

A display module 453 may be configured to present information (such as a user interface configured for operating a peripheral device and displaying content and information) through one or more output apparatuses 431 (such as the display screen and the speaker) associated with a user interface 430.

An input processing module 454 may be configured to detect one or more user enters or interactions from one or more input devices 432, and translate the detected input or interaction.

In some instances, an apparatus provided in the one or more aspects of this application may be implemented by using software. FIG. 3 shows an apparatus 455 for rendering a terrain image that is stored in the memory 450. The apparatus 455 for rendering a terrain image may be software in a form of a program, a plug-in, and the like, including one or more of the following software modules: a first determining module 4551, a first obtaining module 4552, a first updating module 4553, a second determining module 4554, and/or a first rendering module 4555. These modules are logical and can be combined or split in different manners depending on implemented functions. Functions of the modules are described below.

In some other aspects, the apparatus provided in the one or more aspects of this application may be implemented in hardware. For example, the apparatus provided in the one or more aspects of this application may be implemented by using a processor (such as for example, a hardware-decoding processor) programmed to perform the method for rendering the terrain image provided in the one or more aspects of this application. For example, the processor may use one or more application specific integrated circuits (ASICs), DSPs, programmable logic devices (PLDs), complex programmable logic devices (CPLDs), field-programmable gate arrays (FPGAs), or other electronic elements.

A method for rendering a terrain image provided in the one or more aspects of this application is described with reference to exemplary applications and implementations of a terminal provided in the one or more aspects of this application.

Figure 4:
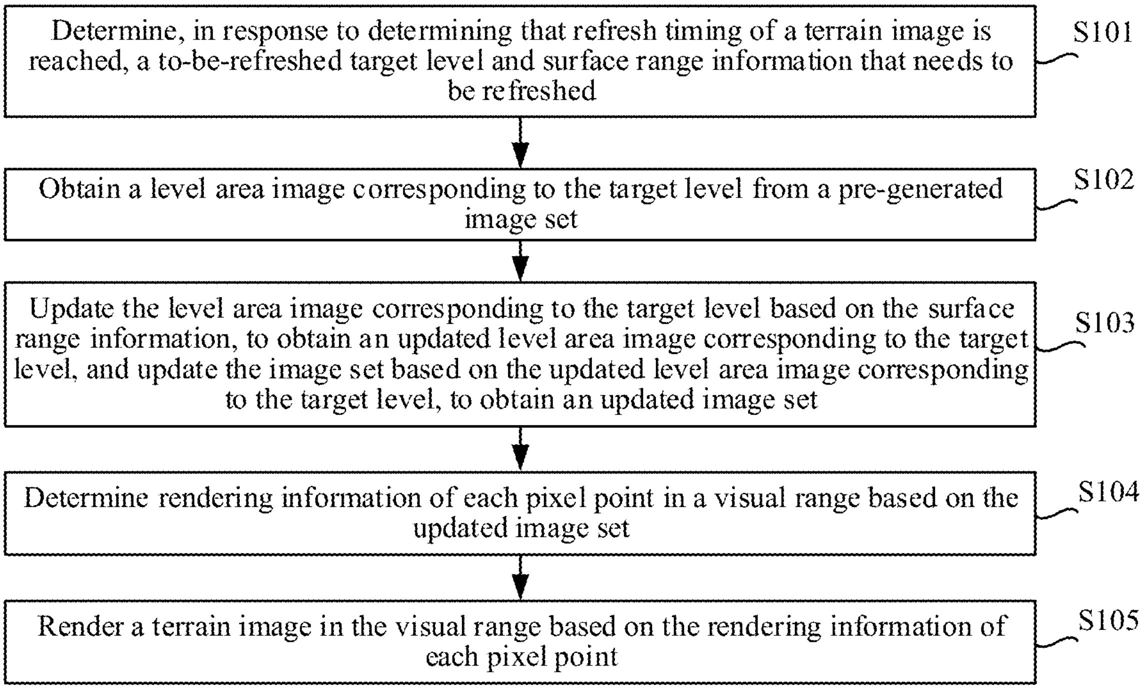
FIG. 4 is a schematic flowchart of an example of an implementation of a method for rendering a terrain image according to one or more aspects of this application.

The one or more aspects of this application provide a method for rendering a terrain image performed by a computer device. The computer device may be a terminal. FIG. 4 is a schematic flowchart of an example of an implementation of a method for rendering a terrain image according to one or more aspects of this application. The following describes, with reference to FIG. 4, operations of the method for rendering a terrain image according to the one or more aspects of this application.

Operation S101: Determine, in response to determining that refresh timing of a terrain image is reached, a to-be-refreshed target level and surface range information that needs to be refreshed.

In one example, whether the refresh timing of the terrain image is reached may be determined through movement information of a virtual object in a virtual scene. The virtual object may be a virtual character controlled by a user account in an application, or may be a virtual character controlled by a computer program in the application. For example, the application is a game application. The virtual object may be a game character controlled by a user account in the game application, or may be a game monster controlled by a computer program in the game application. The virtual object may be in a human form, an animal form, a cartoon form, or another form. This is not limited in the one or more aspects of this application.

In some instances, when it is detected that the virtual object moves, a movement distance of the virtual object may be obtained, and when the movement distance is greater than a movement threshold, it is determined that the refresh timing of the terrain image is reached. Alternatively, ratios of the movement distance to size information corresponding to different levels of detail may be determined, and when a ratio is greater than a preset ratio threshold, it is determined that the refresh timing is reached. In this case, the to-be-refreshed target level and the surface range information that needs to be refreshed may be further determined based on the movement distance of the virtual object. If the movement distance of the virtual object exceeds a movement threshold determined based on a coverage range corresponding to a specific level of detail, the level of detail may be determined as the target level. Then, the surface range information that needs to be refreshed may be determined based on the coverage range of the target level and the movement information. In one example, the surface range information that needs to be refreshed may be less than the coverage range of the target level.

For example, it is assumed that there are four levels of detail, that is, a level of detail 0, a level of detail 1, a level of detail 2, and a level of detail 3. A coverage range corresponding to the level of detail 0 may be 10 meters*10 meters, a coverage range corresponding to the level of detail 1 may be 20 meters*20 meters, a coverage range corresponding to the level of detail 2 may be 40 meters*40 meters, and a coverage range corresponding to the level of detail 3 may be 80 meters*80 meters. A movement threshold corresponding to the level of detail 0 may be two meters, a movement threshold corresponding to the level of detail 1 may be four meters, a movement threshold corresponding to the level of detail 2 may be eight meters, a movement threshold corresponding to the level of detail 3 may be 16 meters, and the movement distance of the virtual object may be three meters. Because the movement distance of the virtual object is greater than only the movement threshold corresponding to the level of detail 0, the level of detail 0 is the target level.

In some instances, a ratio of the movement distance of the virtual object to size information corresponding to each level of detail may alternatively or additionally be determined. If a ratio corresponding to a specific level of detail is greater than the preset ratio threshold, the level of detail may be determined as the target level. For example, the movement distance of the virtual object may be three meters, size information corresponding to the level of detail 0 may be 10 meters, size information corresponding to the level of detail 1 may be 20 meters, size information corresponding to the level of detail 2 may be 40 meters, and size information corresponding to the level of detail 3 may be 80 meters. In this case, a ratio corresponding to the level of detail 0 may be 0.3, a ratio corresponding to the level of detail may be is 0.15, a ratio corresponding to the level of detail 2 may be 0.075, and a ratio corresponding to the level of detail 3 may be 0.0375. It is assumed that a ratio threshold is 0.2. Because the ratio corresponding to the level of detail 0 is greater than the ratio threshold, the target level is the level of detail 0.

In some instances, the movement information may include the movement distance and a movement direction. When the surface range information that needs to be refreshed is determined, an offset in a horizontal direction and an offset in a vertical direction may be first determined based on the movement distance and the movement direction, and then the surface range information that needs to be refreshed may be determined based on size information of the target level.

For example, when the movement distance is two meters, the movement direction is 90° (that is, the movement direction is forward), and the target level is the level of detail 0, the offset in the horizontal direction is 2*cos 90°, that is, 0, and the offset in the vertical direction is 2*sin 90°, that is, 2. Then, the surface range information that needs to be refreshed may be a range in which a coverage range of the current target level may be moved forward by two meters, that is, a rectangular area in which the coverage range of the current target level may be moved forward by 2*10 meters.

Operation S102: Obtain a level area image corresponding to the target level from a pre-generated image set.

The image set may include at least two map images, for example, may include at least two of the following: a color map image, a material map image, or a normal height map image. Correspondingly, obtaining the level area image corresponding to the target level from the pre-generated image set may be obtaining at least two of a color level area image corresponding to the target level, a material level area image corresponding to the target level, or a normal height level area image corresponding to the target level from the image set.

The image set may be generated through pre-baking of the terminal, or may be obtained from a server. Each map image may include a plurality of level area images that are generated using a clipmap rendering process and that are of different levels of detail, and images of different levels of detail in the map image may have same size information, but may have different coverage ranges. The map image may include a plurality of image areas (which may also be referred to as cells in some instances), and each image area may correspond to a level area image of one level of detail. In other words, a map image may be composited by splicing level area images having a plurality of levels of detail in a specific order. For example, the order may be from left to right and from bottom to top. For example, the map image may be a color map image. It is assumed that there are four levels of detail. The color map image is composited by splicing color level area images of the four levels of detail. A lower left corner may be a color level area image corresponding to a level of detail 0, a lower right corner may be a color level area image corresponding to a level of detail 1, an upper left corner may be a color level area image corresponding to a level of detail 2, and an upper right corner may be a color level area image corresponding to a level of detail 3. When it is known that the target level is the level of detail 0, the color level area image corresponding to the level of detail 0 may be obtained from the lower left corner of the color map image according to an arrangement order of the level area images.

Operation S103: Update the level area image corresponding to the target level based on the surface range information, to obtain an updated level area image corresponding to the target level, and update the image set based on the updated level area image corresponding to the target level, to obtain an updated image set.

In one example, the image set may include at least a normal height map image, a color map image, and a material map image. In this case, during implementation of this operation, the normal height level area image corresponding to the target level, the color level area image corresponding to the target level, and the material level area image corresponding to the target level may be updated based on the surface range information to obtain an updated normal height level area image corresponding to the target level, an updated color level area image corresponding to the target level, and an updated material level area image corresponding to the target level respectively.

In some instances, updating the image set based on the updated level area image corresponding to the target level may comprise replacing an original normal height level area image corresponding to the target level in the normal height map image, an original color level area image corresponding to the target level in the color map image, and an original material level area image corresponding to the target level in the material map image with the updated normal height level area image corresponding to the target level, the updated color level area image corresponding to the target level, and the updated material level area image corresponding to the target level, respectively, to correspondingly obtain an updated normal height map image, an updated color map image, and an updated material map image, so that the updated normal height map image, the updated color map image, and the updated material map image form an updated image set.

Operation S104: Determine rendering information of each pixel point in a visual range based on the updated image set.

During implementation of this operation, world coordinates of each pixel point in the visual range may be first obtained, and mapping texture coordinates of each pixel point may be determined based on the world coordinates. Then, a pixel value that represents a normal height and that corresponds to each pixel point, a pixel value that represents a color and that corresponds to each pixel point, and a pixel value that represents a material that corresponds to each pixel point may be respectively obtained from the updated normal height map image, the updated color map image, and the updated material map image based on the mapping texture coordinates. Then, the pixel value that represents the normal height, the pixel value that represents the color, and the pixel value that represents the material may be determined as the rendering information of each pixel point.

Operation S105: Render a terrain image in the visual range based on the rendering information of each pixel point.

After the pixel value that represents the normal height that is of each pixel point, the pixel value that represents the color and that is of each pixel point, and the pixel value that represents the material and that is of each pixel point are obtained, a height and normal information of each pixel point may be determined based on the pixel value that represents the normal height, so that an illumination result of each pixel point may be determined, a color of each pixel point may be determined based on the pixel value that represents the color, and a metal degree and roughness of each pixel point may be determined based on the pixel value that represents the material, so that the terrain image in the visual range may be rendered based on the foregoing information.

In the method for rendering a terrain image in the one or more aspects of this application, when it is determined that refresh timing of a terrain image is determined, a to-be-refreshed target level and surface range information that needs to be refreshed may be first determined, the surface range information that needs to be refreshed being less than a coverage range corresponding to the to-be-refreshed target level. Then, a level area image corresponding to the target level may be obtained from a pre-generated image set, the image set including at least two map images, the map image including a plurality of level area images that are generated using a clipmap rendering process and that are of different levels of detail. In addition, the level area image corresponding to the target level may be updated based on the surface range information, to obtain an updated level area image corresponding to the target level. The image set may be updated based on the updated level area image corresponding to the target level, to obtain an updated image set. Finally, rendering information of each pixel point in a visual range may be determined based on the updated image set, and a terrain image in the visual range may be rendered based on the rendering information of each pixel point. Because a plurality of levels of detail pictures of different distances are generated by pre-blending a plurality of layers of map images using a clipmap rendering process, and the levels of detail pictures are combined into a large map image, a real-time process of blending and baking during rendering is omitted (i.e., no longer needed), thereby reducing the amount of computing resources required to render the terrain. In addition, when refreshing is required, only a part of a surface range in a coverage range corresponding to the target level may be updated, thereby improving terrain rendering performance and efficiency.

In some instances, before operation S101, whether the refresh timing of the terrain image is reached may be further determined through the following operation S001 to operation S003. The following describes the operations.

Operation S001: Obtain, when it is detected that a virtual object moves in a virtual scene, a movement distance of the virtual object and size information corresponding to each level of detail.

The movement distance of the virtual object may be determined based on first coordinates before the virtual object moves and second coordinates after the virtual object moves. Because a display size of an entire rendered virtual scene and a physical size of the virtual scene may have a specific scaling proportion, for example, the display size of the virtual scene may be 1024*1024, and the physical size of the virtual scene may be 2048 meters*2048 meters. In this case, the scaling proportion of the display size of the virtual scene to the physical size may be 0.5. In other words, when coordinates of the virtual scene are moved by 1, the virtual scene may be actually moved by two meters. Therefore, after a distance between two coordinate points may be determined based on the first coordinates and the second coordinates, the distance may be multiplied by 2, to obtain the movement distance of the virtual object.

The size information corresponding to each level of detail may be a side length of a coverage range corresponding to each level of detail. For example, it is assumed that there are four levels of detail, that is, a level of detail 0, a level of detail 1, a level of detail 2, and a level of detail 3. A coverage range corresponding to the level of detail 0 may be 10 meters*10 meters, a coverage range corresponding to the level of detail 1 may be 20 meters*20 meters, a coverage range corresponding to the level of detail 2 may be 40 meters*40 meters, and a coverage range corresponding to the level of detail 3 may be 80 meters*80 meters.

Operation S002: Determine a ratio of the movement distance to the size information corresponding to each level of detail.

Each ratio may be obtained by dividing the movement distance by the size information corresponding to each level of detail. It may be assumed that the movement distance is three meters. A ratio corresponding to the level of detail 0 may be 0.3, a ratio corresponding to the level of detail 1 may be 0.15, a ratio corresponding to the level of detail 2 may be 0.075, and a ratio corresponding to the level of detail 3 may be 0.0375.

Operation S003: Determine whether a level of detail whose ratio is greater than a preset ratio threshold exists.

The ratio threshold may be a real number greater than 0 and less than 1. When it is determined that the level of detail whose ratio is greater than the preset ratio threshold exists, it may be determined that the refresh timing of the terrain image is reached. In this case, operation S101 may be entered. When it is determined that the level of detail whose ratio is greater than the ratio threshold does not exist, it may be determined that the refresh timing of the terrain image is not reached, and operation S001 may be returned.

In the foregoing operation S001 to operation S003, whether the refresh timing is reached may be determined based on the ratio of the movement distance of the virtual object to the size information corresponding to each level of detail. When at least one ratio is greater than the ratio threshold, which indicates that the virtual object in one of the detail levels has significant level of movement (e.g., has moved significantly per a pre-set threshold), a map image of the level of detail may be refreshed. Therefore, a determining condition for determining whether the refresh timing is reached is provided.

In some instances, the determining a to-be-refreshed target level and surface range information that needs to be refreshed in operation S101 may be implemented through the following operation S1011 to operation S1013. The following describes the operations.

Operation S1011: Determine the level of detail whose ratio is greater than the ratio threshold as the to-be-refreshed target level.

It may be assumed that the ratio threshold is 0.1. Based on the foregoing example, the ratio corresponding to the level of detail 0 may be 0.3, the ratio corresponding to the level of detail 1 may be 0.15, the ratio corresponding to the level of detail 2 may be 0.075, and the ratio corresponding to the level of detail 3 may be 0.0375. Because the ratio corresponding to the level of detail 0 and the ratio corresponding to the level of detail 1 are greater than the ratio threshold, the level of detail 0 and the level of detail 1 may be determined as the to-be-refreshed target levels.

Operation S1012: Obtain a movement direction of the virtual object.

In one example, the movement direction of the virtual object may be determined based on the first coordinates before the virtual object moves and the second coordinates after the virtual object moves. For example, if the first coordinates are (x1, y1), and the second coordinates are (x2, y2), the movement direction may be determined through arctan $$\left(\frac{y2 - y1}{x2 - x1}\right).$$

Operation S1013: Determine, based on the movement direction, the movement distance, and size information of the target level, the surface range information that needs to be refreshed.

In some instances, an offset in a horizontal direction and an offset in a vertical direction may be determined based on the movement distance s and the movement direction, and then the surface range information that needs to be refreshed may be determined based on the size information of the target level.

For example, when the movement distance is two meters, the movement direction may be 90° (that is, the movement direction is forward), and the target level may be the level of detail 0, the offset in the horizontal direction may be 2*cos 90°, that is, 0, and the offset in the vertical direction may be 2*sin 90°, that is, 2. Then, the surface range information that needs to be refreshed may be a range in which a coverage range of the current target level is moved forward by two meters, that is, a rectangular area in which the coverage range of the current target level is moved forward by 2*10 meters.

Through the foregoing operation S1011 to operation S1013, the offsets of the virtual object in the horizontal direction and the vertical direction may be determined based on the movement distance and the movement direction of the virtual object. Because the coverage range of the target level may be centered on a position of the virtual object, after the virtual object moves, the coverage range of the target level may be updated based on the offsets of the virtual object in the horizontal direction and the vertical direction and the size information corresponding to the target level, to ensure that the virtual object is located at a center position of the target level.

In some instances, determining the to-be-refreshed surface range information may alternatively be determining a first area information of a first area whose side length is the size information corresponding to the target level and whose center is the second coordinates after the virtual object moves, where the first area information may be coordinates of a lower left corner and an upper right corner of the first area, and then determining, based on second area information of a second area whose center is the first coordinates before the virtual object moves, an area that is in the first area and that is located outside the second area as a to-be-refreshed surface range. The surface range information may include vertex coordinates that can represent the to-be-refreshed surface range. For example, the to-be-refreshed surface range may be the rectangular area in which the coverage range of the current target level may be moved forward by 2*10 meters, and the to-be-refreshed surface range information may be coordinates of two diagonal vertices of the rectangular area.

In some instances, updating the level area image corresponding to the target level based on the surface range information, to obtain an updated level area image corresponding to the target level in the foregoing operation S103 may be implemented through the following operation S1031 to operation S1034. The following describes the operations.

Operation S1031: Offset the level area image corresponding to the target level based on the movement direction and the movement distance of the virtual object, to obtain an offset level area image.

Figure 8:
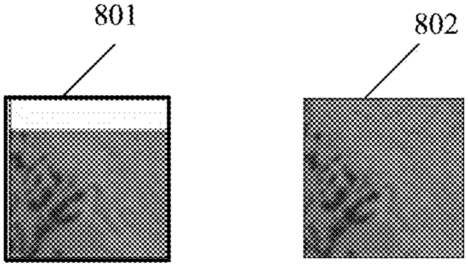
FIG. 8 is a schematic diagram of an example of partially refreshing a map image according to one or more aspects of this application.

In some instances, the level area image corresponding to the target level may be moved by the movement distance in a direction opposite to the movement direction of the virtual object, to obtain the offset level area image. For example, when the movement distance is two meters, and the movement direction is 900 (that is, the movement direction is forward), the level area image corresponding to the target level may be moved by two meters in a direction (−90°, that is, backward) opposite to the movement direction, to obtain the offset level area image. Referring to FIG. 8, because the virtual object moves forward by two meters, the level area image corresponding to the target level may be moved backward by two meters, to obtain an offset level area image corresponding to the target level shown in 801 in FIG. 8. A blank part in 801 is a part that actually needs to be refreshed.

Operation S1032: Store the offset level area image as a temporary image.

A size of the temporary image may be the same as a size of the map image of the target level. Because after offsetting, when the offset level area image is stored as the temporary image, a part of the temporary image may be a blank part, the part may be an area corresponding to the to-be-refreshed surface range information.

Operation S1033: Determine a supplementary map image corresponding to the surface range information that needs to be refreshed.

In one example, the image set may include at least the color map image, the normal height map image, and the material map image. In this operation, it may be determined that the supplementary map image corresponding to the to-be-refreshed surface range information includes a color supplementary map image, a material supplementary map image, and a normal height supplementary map image. Because the surface range information may include the vertex coordinates that can represent the to-be-refreshed surface range, a plurality of surface texture images configured for baking a color map may be determined based on the vertex coordinates, and the plurality of surface texture images may be blended, to obtain the color supplementary map image. Similar to the color map, a material map may also be obtained by blending and baking a plurality of layers of material texture images. Therefore, a plurality of corresponding material texture images may be determined based on the surface range information that needs to be refreshed, and the plurality of material texture images may be blended, to obtain the material supplementary map image. However, a normal height map may be directly obtained based on normal information and height information, and multi-layer blending is not performed. Therefore, the normal height supplementary map image may be directly determined based on the surface range information that needs to be refreshed.

Operation S1034: Add the supplementary map image to the temporary image, to obtain the updated level area image corresponding to the target level.

In some instances, the supplementary map image is added to the blank part of the temporary image, to obtain a filled temporary image, and the filled temporary image is determined as the updated level area image corresponding to the target level.

In the foregoing operation S1031 to operation S1034, when the updated level area image corresponding to the target level is determined, the supplementary map image is determined based on the surface range information that needs to be refreshed, instead of updating the level area image of the entire target level. Therefore, an amount of to-be-updated data of the level area image can be reduced, and updating efficiency can be improved.

In one example, the image set may include the color map image, the normal height map image, and the material map image. Correspondingly, the updated level area image corresponding to the target level may include the updated color level area image corresponding to the target level, the updated normal height level area image corresponding to the target level, and the updated material level area image corresponding to the target level. Therefore, updating the image set based on the updated level area image corresponding to the target level, to obtain an updated image set in operation S103 may be implemented through the following operations.

Operation S1035: Replace an original color level area image corresponding to the target level in the color map image with the updated color level area image, to obtain an updated color map image.

Operation S1036: Replace an original normal height level area image corresponding to the target level in the normal height map image with the updated normal height level area image, to obtain an updated normal height map image.

Operation S1037: Replace an original material level area image corresponding to the target level in the material map image with the updated material level area image, to obtain an updated material map image.

Operation S1038: Determine the updated color map image, the updated normal height map image, and the updated material map image as the updated image set.

Through the foregoing operation S1035 to operation S1038, a process of updating the color map image, the normal height map image, and the material map image may be implemented, to obtain the updated image set. Therefore, a necessary data basis is provided for subsequently performing texture sampling by using the updated image set.

In some instances, a pre-baking process of the color map may be completed through the following operations.

Operation S201: Obtain a pre-generated first splat map and a plurality of to-be-blended surface texture images corresponding to each level of detail.

The first splat map may be pre-generated by using a third-party tool, and the plurality of to-be-blended surface texture images corresponding to each level of detail may be obtained from a server. The plurality of surface texture images may include a land texture image, a grass texture image, or the like.

Operation S202: Perform fusion processing on the plurality of surface texture images corresponding to each level of detail based on the first splat map, to obtain a fused surface texture image corresponding to each level of detail.

In some instances, the plurality of surface texture images may be baked using a clipmap rendering process, to obtain the fused surface texture image corresponding to each LOD. The fused surface texture images corresponding to different levels of detail may have a same size (that is, a same resolution, for example, 512*512), but may have different coverage ranges. For example, a level 0 may store a surface within 10 meters, a level 1 may store a surface within 20 meters, a level 2 may store a surface within 40 meters, and the rest may be deduced by analogy until a maximum field of view is obtained.

Operation S203: Perform composition processing on the fused surface texture images corresponding to the levels of detail, to obtain the color map image.

The fused surface texture images corresponding to the levels of detail may be spliced, to obtain a color map. For example, four 512*512 fused surface texture images may be composited (or spliced), to obtain a 1024*1024 color map.

Through the foregoing operation S201 to operation S203, a plurality of layers of surface texture images may be blended through the first splat map, and fused surface texture images corresponding to different levels of detail may be generated using a clipmap rendering process. In this way, an effect of a plurality of layers of blended surface maps may be restored, and the effect may be applied to a large world scene.

In some instances, a pre-baking process of the normal height map may be completed through the following operations.

Operation S301: Obtain normal information of each pixel point in a coverage range corresponding to each level of detail, and compress the normal information, to obtain compressed normal information.

An illumination effect of a pixel on a model surface is only related to illumination and a normal on the surface, and a direction of the normal determines the illumination effect of the model surface. Therefore, the most important part of illumination information may be an angle between an incident direction of light and a normal of an incident point. To implement a more realistic rendering effect, the normal information of each pixel point may be determined. Generally, the normal information needs to be represented by four bytes. In one example, the normal information of each pixel point in the coverage range corresponding to each level of detail may be obtained from a normal map, and the obtained normal information needs to be represented by three bytes. In one example, the normal information is compressed to two bytes. For example, an x value and a y value of the normal may be converted to a range of 0 to 255 for storage, and a z value is discarded. During use, the z value may be calculated through the x value and the y value.

Operation S302: Obtain height information of each pixel point in the coverage range corresponding to each level of detail.

The height information of each pixel point may be obtained from a height map. The height map may be generally stored by using 16-bit data, and may have a value range of 0 to 65535, where 0 represents a lowest point, and 65535 represents a highest point. Then, the height information may be encoded by using a bit operation, and the encoded height information occupies two bytes. The encoded height information may be decoded during the use.

Operation S303: Generate a normal height map corresponding to each level of detail based on the compressed normal information and the height information of each pixel point in the coverage range corresponding to each level of detail.

In some instances, the height information of each pixel point may be stored on a colored RG channel, and the compressed normal information may be stored on a BA channel, occupying exactly four channels of one color value. Therefore, the normal height map corresponding to each level of detail may be generated.

Operation S304: Perform composition processing on the normal height maps corresponding to the levels of detail, to obtain the normal height map image.

In some instances, the normal height maps corresponding to the levels of detail may be composited and spliced, to obtain a normal height map.

A splicing order used when the fused surface texture images corresponding to the levels of detail are composited and spliced may be the same as a splicing order used when the normal height maps corresponding to the levels of detail are composited and spliced. Therefore, it is ensured that a position of a fused surface texture image of a same level of detail is the same as that of the normal height map.

Through the foregoing operation S301 to operation S304, the normal information and the height information may be composited into one map, so that a quantity of maps can be reduced, and an update amount of the map image and a data processing amount for performing texture sampling can be reduced, thereby improving rendering efficiency and performance.

In some instances, operation S104, determine rendering information of each pixel point in a visual range based on the updated image set, includes the following operations Operation S1041: Obtain world coordinates of each pixel point in the visual range.

Operation S1042: Determine texture mapping coordinates of each pixel point based on the world coordinates of each pixel point.

In some instances, a level of detail at which each pixel point is located may be first determined, then a first offset of each pixel point of the level of detail and a second offset of the level of detail at which each pixel point is located in each map image may be calculated, and the first offset and the second offset may be added, to obtain the texture mapping coordinates of the pixel point.

When the level of detail at which each pixel point is located is determined, recorded coordinates of the current virtual object may be first subtracted from the world coordinates according to an idea of clipmap to obtain first relative coordinates, and then the first relative coordinates may be divided by a size of a minimum level of detail. After the result is rounded, a value obtained through a log 2 exponential operation may be the level of detail at which the pixel point is located.

In some instances, information such as coordinates of the level of detail at which the pixel point is located may be obtained from a pre-stored level information configuration table based on the level of detail at which the pixel point is located. The coordinates of the level of detail at which the pixel point is located may be subtracted from the world coordinates of the pixel point, to obtain second relative coordinates, and then scaling conversion may be performed on the second relative coordinates to obtain the first offset of the pixel point of the level of detail. The scaling conversion may be performed on the second relative coordinates based on the scaling proportion of the display size of the virtual scene to the physical size, to obtain the first offset of the pixel point of the level of detail.

The second offset of the level of detail at which the pixel point is located in the map image is calculated. In some instances, the level of detail at which the pixel point is located may be divided by a quantity of blocks in the map image, to obtain the second offset. A quotient obtained by dividing the level of detail at which the pixel point is located by the quantity of blocks in the map image may be determined as a second horizontal offset, and a remainder is determined as a second vertical offset. After the first offset and the second offset are obtained, the two offsets may be added, to obtain the texture mapping coordinates of the pixel point.

Operation S1043: Determine, based on the texture mapping coordinates of each pixel point, the rendering information of each pixel point from the updated image set.

Figure 5:
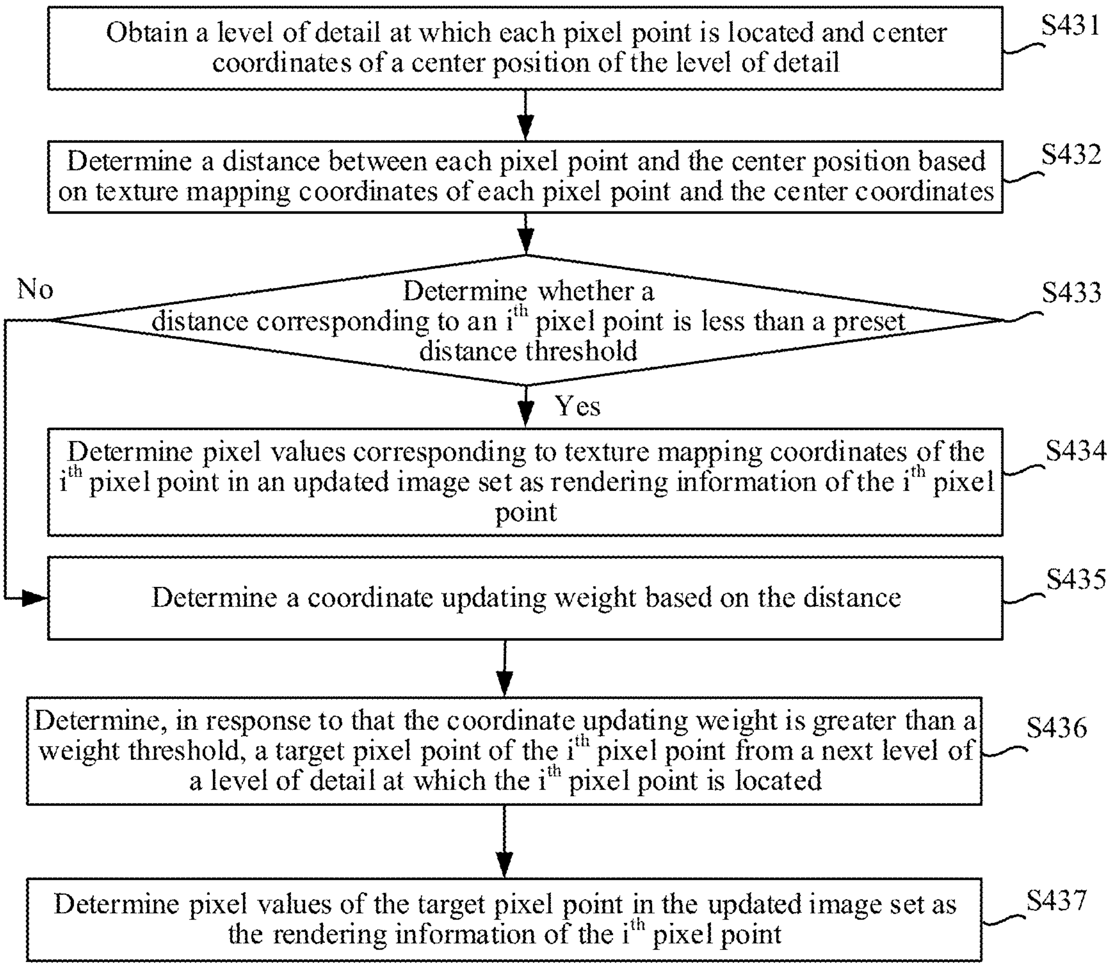
FIG. 5 is a schematic flowchart of an example of determining rendering information of each pixel point according to one or more aspects of this application.

In some instances, operation S1043 may be implemented by operation S431 to operation S437 shown in FIG. 5. The following describes the operations with reference to FIG. 5.

Operation S431: Obtain a level of detail at which each pixel point is located and center coordinates of a center position of the level of detail.

Because the level of detail at which each pixel point is located has been determined in operation S1042, the level of detail at which each pixel point is located may be directly obtained. The center coordinates of the center position of the level of detail may be obtained from the level information configuration table.

Operation S432: Determine a distance between each pixel point and the center position based on the texture mapping coordinates of each pixel point and the center coordinates.

Operation S433: Determine whether a distance corresponding to an it pixel point is less than a preset distance threshold.

$i=1, 2, \ldots, N$, wherein N is a total quantity of pixel points, and N is a positive integer greater than 2. When the distance corresponding to the it pixel point is less than the preset distance threshold, the it pixel point may be relatively close to the center position. In this case, operation S434 may be entered. When the distance corresponding to the $i^{th}$ pixel point is greater than or equal to the distance threshold, the $i^{th}$ pixel point may be relatively far away from the center position and relatively close to an edge corresponding to a coverage range of the level of detail. In this case, operation S435 may be entered.

Operation S434: Determine pixel values corresponding to texture mapping coordinates of the it pixel point in the updated image set as rendering information of the $i^{th}$ pixel point.

In one example, when the distance corresponding to the it pixel point is less than the preset distance threshold, the $i^{th}$ pixel point may be relatively close to the center position, that is, is relatively far away from the edge corresponding to the coverage range of the level of detail. Therefore, the pixel values corresponding to the texture mapping coordinates of the $i^{th}$ pixel point in the color map image, the normal height map image, and the material map image may be obtained from the updated image set. In other words, three pixel values may be obtained in this case, and the three pixel values may be determined as the rendering information of the $i^{th}$ pixel point.

Operation S435: Determine a coordinate updating weight based on the distance.

In one example, a correspondence between the distance and the coordinate updating weight may be preset, and the correspondence may be a positive correlation. In other words, a larger distance may indicate a larger coordinate updating weight. In other words, a larger distance between a pixel point and center coordinates may indicate a higher probability of coordinate update, and the updated weights of a plurality of pixel points having a same distance from the center coordinates are the same.

Operation S436: Determine, in response to determining that the coordinate updating weight is greater than a weight threshold, a target pixel point of the $i^{th}$ pixel point from a next level of a level of detail at which the $i^{th}$ pixel point is located.

In some instances, the weight threshold may be preset or determined randomly. For example, the weight threshold may be a noise random sampling value. When the coordinate updating weight is greater than the weight threshold, coordinate update may be performed on the $i^{th}$ pixel point. In this case, the target pixel point of the $i^{th}$ pixel point may be determined from the next level of the level of detail at which the $i^{th}$ pixel point is located. The target pixel point may be a pixel point in the next level of the level of detail at which the $i^{th}$ pixel point is located, and the target pixel point and the it pixel point may have the same world coordinates.

Operation S437: Determine pixel values of the target pixel point in the updated image set as the rendering information of the $i^{th}$ pixel point.

Because different levels of detail have different pixel precision, a higher level of detail may indicate lower pixel precision. Therefore, in one example, to avoid an apparent pixel precision difference at an interface between different levels of detail, any pixel point in a higher level of a pixel point close to an edge in a lower level of detail in two adjacent levels of details may be determined as the target pixel point of the it pixel point, and the pixel values corresponding to the target pixel point may be determined as the rendering information of the $i^{th}$ pixel point. Therefore, smooth transition between different levels of detail is implemented.

Figure 6:
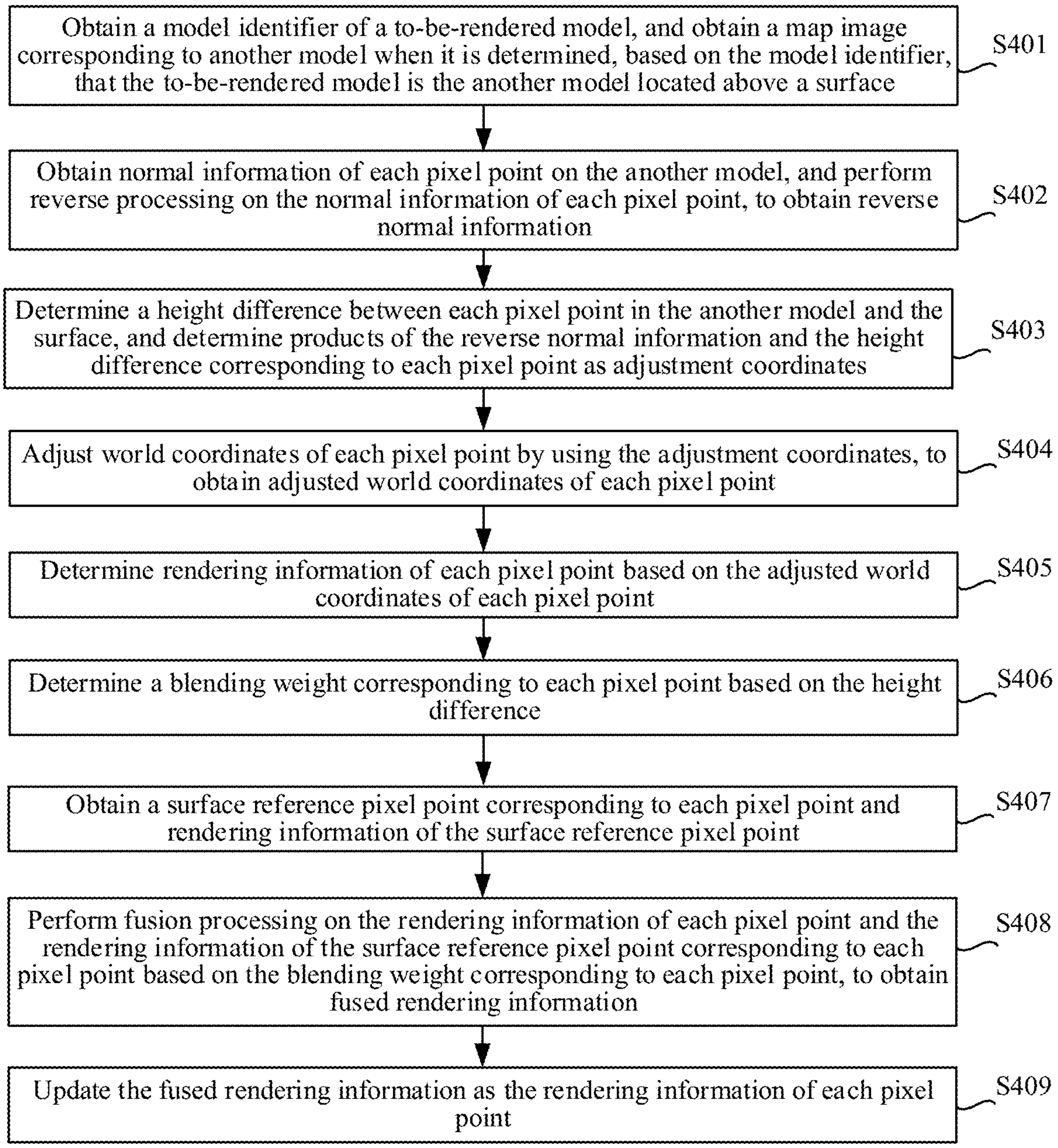
FIG. 6 is a schematic flowchart of another example of an implementation of a method for rendering a terrain image according to one or more aspects of this application.

In some instances, it may be further determined, based on a model identifier of a to-be-rendered model, whether world coordinates of the to-be-rendered model need to be adjusted. When it is determined, based on the model identifier, that the to-be-rendered model is another model above a surface, for example, a model such as a rock, a house, or a tree, the terrain image may be further rendered through the following operations shown in FIG. 6. The following describes the operations with reference to FIG. 6.

Operation S401: Obtain a model identifier of a to-be-rendered model, and obtain a map image corresponding to another model when it is determined, based on the model identifier, that the to-be-rendered model is the another model above a surface.

In some instances, it may be determined, through the model identifier, whether the to-be-rendered model is a model (for example, a rock or a tree) above the surface, a model (for example, a grass) attached to the surface, or a model (for example, a subsurface castle) below the surface.

Operation S402: Obtain normal information of each pixel point on the another model, and perform reverse processing on the normal information of each pixel point, to obtain reverse normal information.

In some instances, a normal map of the another model may be first obtained. Then, the normal information of each pixel point on the another model may be obtained from the normal map. The normal information of the pixel point may be represented as a normal vector. The reverse processing may be performed on the normal information of the pixel point, and the normal vector may be rotated by 180°, to obtain the reverse normal information.

Operation S403: Determine a height difference between each pixel point in the another model and the surface, and determine products of the reverse normal information and the height difference corresponding to each pixel point as adjustment coordinates.

In some instances, height data of each pixel point in the another model and height data of the surface in which the another model is located may be first obtained. Then, the height difference between each pixel point and the surface may be determined based on the height data of each pixel point and the height data of the surface.

Operation S404: Adjust the world coordinates of each pixel point by using the adjustment coordinates, to obtain adjusted world coordinates of each pixel point.

In some instances, an addition operation may be performed on the adjustment coordinates of each pixel point and the world coordinates of each pixel point, to obtain the adjusted world coordinates of each pixel point.

Operation S405: Determine the rendering information of each pixel point based on the adjusted world coordinates of each pixel point.

In some instances, coordinate conversion may be first performed on the adjusted world coordinates of each pixel point, to obtain texture mapping coordinates of each pixel point. Then, the rendering information of each pixel point may be determined from a map image corresponding to the another model based on the texture mapping coordinates of each pixel point. An implementation process of performing coordinate conversion on the adjusted world coordinates of each pixel point may be similar to the implementation process of operation S1042. For implementation, refer to the implementation process of operation S1042.

Operation S406: Determine a blending weight corresponding to each pixel point based on the height difference.

In one example, a correspondence between the height difference and the blending weight may be preset, and the correspondence may be a negative correlation. In other words, a smaller height difference of a pixel point may indicate a higher blending weight corresponding to the pixel point. In some instances, the correspondence between the height difference and the blending weight may be obtained, and the blending weight corresponding to each pixel point may be determined based on the correspondence and the height difference corresponding to each pixel point.

Operation S407: Obtain a surface reference pixel point corresponding to each pixel point and rendering information of the surface reference pixel point.

In one example, surface reference pixel point corresponding to each pixel point on the another model may be a pixel point whose coordinate in a horizontal direction is the same as a coordinate of each pixel point in the horizontal direction and whose coordinate in a vertical direction is on the surface model. For example, coordinates of a pixel point may be (20, 50). Then, coordinates of a surface reference pixel point corresponding to the pixel point may be (20, 0). After the surface reference pixel point corresponding to each pixel point is determined, the rendering information of the surface reference pixel point may be obtained based on texture mapping coordinates of the surface reference pixel point.

Operation S408: Perform fusion processing on the rendering information of each pixel point and the rendering information of the surface reference pixel point corresponding to each pixel point based on the blending weight corresponding to each pixel point, to obtain fused rendering information.

The rendering information of the surface reference pixel point may include surface reference normal height information, surface reference color information, and surface reference material information. Correspondingly, the rendering information of each pixel point on the another model may include normal height information, color information, and material information of each pixel point. In some instances, weighted summation may be performed on the surface reference normal height information and the normal height information of each pixel point by using the blending weight of each pixel point, to obtain fused normal height information; weighted summation may be performed on the surface reference color information and the color information of each pixel point by using the blending weight of each pixel point, to obtain fused color information; and weighted summation may be performed on the surface reference material information and the material information of each pixel point by using the blending weight of each pixel point, to obtain fused material information.

For example, performing weighted summation on the surface reference color information and color information of one pixel point by using a blending weight of the pixel point may be performing a multiplication operation on the surface reference color information and the blending weight, to obtain weighted surface reference color information, and then performing an addition operation on the weighted surface reference color information and the color information of the pixel point, to obtain fused color information.

Operation S409: Update the fused rendering information as the rendering information of each pixel point.

Through the foregoing operation S401 to operation S409, when another model higher than a surface is rendered, a direction opposite to a normal of each pixel point in the another model may be obtained, so that offsetting toward the inside of the model is implemented, to adjust world coordinates of the pixel point. In addition, determining of adjusted world coordinates involves only a multiplication operation and an addition operation, and a calculation amount is small. Therefore, rendering efficiency is not affected. Then, an image set may be sampled through the adjusted world coordinates, and rendering information of each pixel point may be obtained, so that a problem of stretching of facades in the another model is resolved, and a rendering effect is more realistic.

The following describes an example application in an actual application scenario in the one or more aspects of this application.

The one or more aspects of this application provide a method for rendering a terrain image. When a program is run, a plurality of layers of surface maps may be blended in advance using a clipmap rendering process, to generate LOD pictures of different distances, and then the LOD pictures may be composited to a large map image. A corresponding pixel value in the map image may be sampled in the clipmap manner when the terrain is rendered. In addition, interpolation may be performed between different LODs by using noise, to implement a smooth transition effect.

When a model object such as a rock is rendered, a corresponding pixel value in the map image may also be sampled, and a color of the corresponding pixel point may be blended with the color of the corresponding pixel point based on height interpolation, to implement a seamless effect of fusing the rock and the ground.

Figure 7:
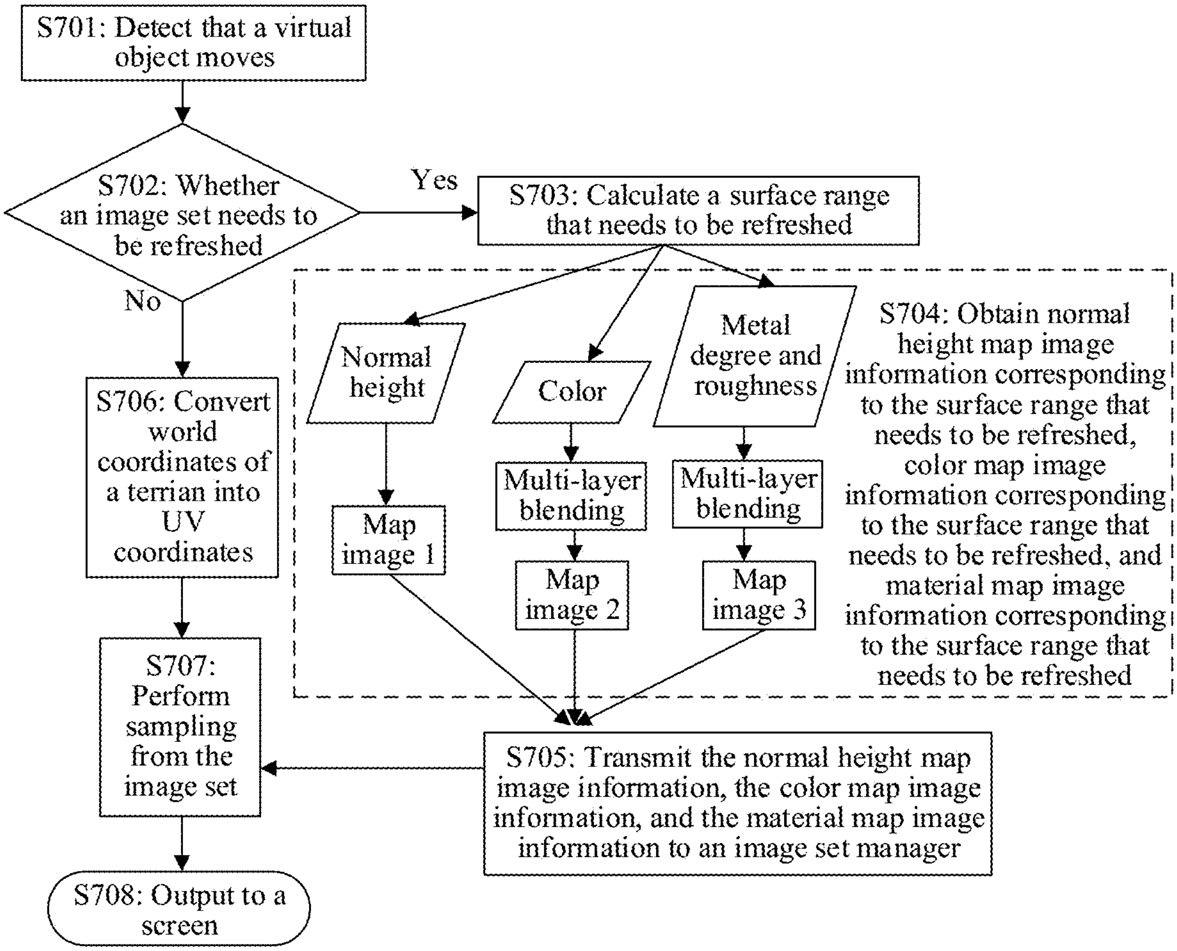
FIG. 7 is a schematic flowchart of another example of an implementation of a method for rendering a terrain image according to one or more aspects of this application.

FIG. 7 is a schematic flowchart of still another implementation of a method for rendering a terrain image according to one or more aspects of this application. As shown in FIG. 7, the procedure includes the following operations.

Operation S701: Detect that a virtual object moves.

Operation S702: Determine whether an image set needs to be refreshed.

The image set may include a map image 1, a map image 2, and a map image 3. In some instances, whether the image set needs to be refreshed may be determined based on the movement distance of the virtual object. It may be determined whether a ratio of a movement distance to a coverage range corresponding to the minimum level is greater than a ratio threshold. When the ratio of the movement distance to the coverage range corresponding to the minimum level is greater than or equal to the ratio threshold, it may be determined that the image set needs to be refreshed, and operation S703 may be entered. When the ratio of the movement distance to the coverage range corresponding to the minimum level is less than the ratio threshold, it may be determined that the image set does not need to be refreshed, and operation S706 may be entered.

Operation S703: Calculate a surface range that needs to be refreshed.

Operation S704: Obtain normal height map image information corresponding to the surface range that needs to be refreshed, color map image information corresponding to the surface range that needs to be refreshed, and material map image information corresponding to the surface range that needs to be refreshed.

In one example, that the color map image information corresponding to the surface range that needs to be refreshed is obtained is used as an example for description. In some instances, a color map of a current level may be first duplicated from the map image 2, and the color map may be offset based on the movement information of the virtual object. The offset color map may be written into a temporary picture. Then, only an area that actually needs to be refreshed in the temporary picture may be rendered. Finally, the temporary picture may be duplicated back into the image set.

FIG. 8 is a schematic diagram of partially refreshing a map image according to one or more aspects of this application. Map 801 in FIG. 8 is a color map after a current level offset. A blank part is a part that actually needs to be refreshed. Map 802 in FIG. 8 is a color map obtained through partial updating. After map 802 is obtained, map 802 is duplicated back into the map image 2.

Operation S705: Transmit the normal height map image information, the color map image information, and the material map image information to an image set manager.

The image set manager may update the map image 1, the map image 2, and the map image 3 based on the normal height map image information corresponding to the surface range that needs to be refreshed, the color map image information corresponding to the surface range that needs to be refreshed, and the material map image information corresponding to the surface range that needs to be refreshed. Operation S707 may be performed after operation S705 is performed.

Operation S706: Convert world coordinates of a terrain into UV coordinates.

Operation S707: Perform sampling from the image set, to obtain a sampling result.

In some instances, the sampling result may include that sampling is performed on the map image 1, the map image 2, and the map image 3 respectively, to obtain a corresponding pixel value that represents normal height, a pixel value that represents a color, and a pixel value that represents a material.

Operation S708: Output to a screen.

In one example, after the corresponding pixel value that represents the normal height, the pixel value that represents the color, and the pixel value that represents the material are obtained through the sampling result, the terrain image may be rendered based on the information, and the terrain image may be outputted and displayed on the screen.

The color map of the map image 2 is still used as an example. When the map image is sampled, the pixel value in the map image may be sampled through world coordinate conversion. First, world coordinates corresponding to a current terrain pixel may be calculated through a conversion function, to obtain a level of the current terrain pixel and an offset relative to camera coordinates. Then, the UV coordinates of the current terrain pixel in each map image may be calculated based on the level of the current terrain pixel and the offset relative to the camera coordinates. Finally, each map image may be directly sampled by using the UV coordinates, to obtain the corresponding pixel value.

Figure 9:
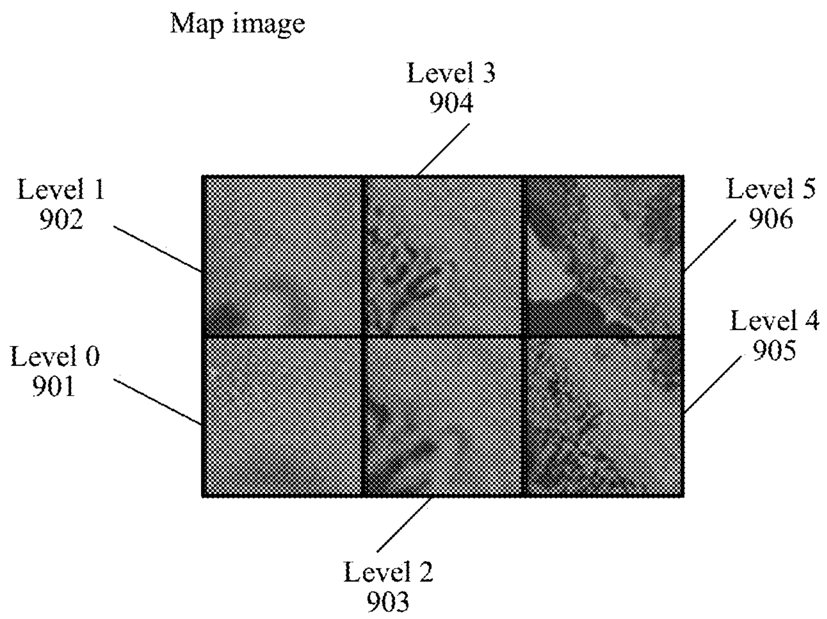
FIG. 9 is a schematic diagram of an example of cells corresponding to different distance ranges in a map image according to one or more aspects of this application.

FIG. 9 is a schematic diagram of cells corresponding to different distance ranges in a map image according to one or more aspects of this application. As shown in FIG. 9, a level 0 corresponds to a cell 901 in a map image 2, a level 1 corresponds to a cell 902 in the map image 2, a level 2 corresponds to a cell 903 in the map image 2, a level 3 corresponds to a cell 904 in the map image 2, a level 4 corresponds to a cell 905 in the map image 2, and a level 5 corresponds to a cell 906 in the map image 2.

In one example, before operation S701, each map image in an image set may be to be generated first. In some instances, before a program is run, a plurality of layers of surface textures may be pre-blended and baked into the map image by using a terrain splat map generated by a third-party tool. For example, the map image may be the map image 2. Each cell in the map image may store a composited surface picture in a specific range. For example, the level 0 may store a surface within 10 meters, the level 1 may store a surface within 20 meters, the level 2 may store a surface within 40 meters. The rest may be deduced by analogy until to the maximum field of view.

Figure 10:
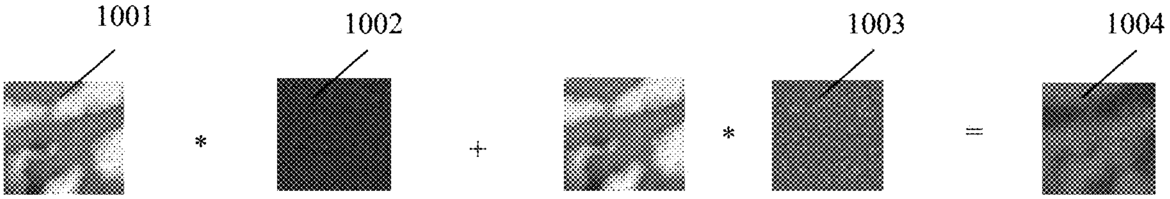
FIG. 10 is a schematic diagram of an example of pre-baking a splat map into a picture according to one or more aspects of this application.

FIG. 10 is a schematic diagram of pre-baking a splat map into a picture according to one or more aspects of this application. As shown in FIG. 10, a grass picture 1002 and a land picture 1003 may be blended and baked by using a splat picture 1001, to obtain a blended texture picture 1004.

In one example, the baking results of different coverage ranges may be duplicated to one corresponding cell in the map image shown in FIG. 10. Data blocks of different cells may be of an equal size, but may have different coverage ranges and precision.

Because data blocks of different distances from the map image in an image set may be of an equal size, but may have different coverage ranges and precision, two adjacent levels may have a double pixel precision difference, and a clear dividing line may be presented at which the two levels are switched.

In one example, an area at which a LOD boundary is located may be first calculated, and noise is randomly sampled on the area, so that an apparent boundary line is processed. On a side with higher precision, mip map value at a next level is randomly sampled, to obtain same pixel precision as an adjacent level, and more values of the mip map value at the next level are used closer to the dividing line, so that a smooth transition effect can be obtained.

Figure 11A:
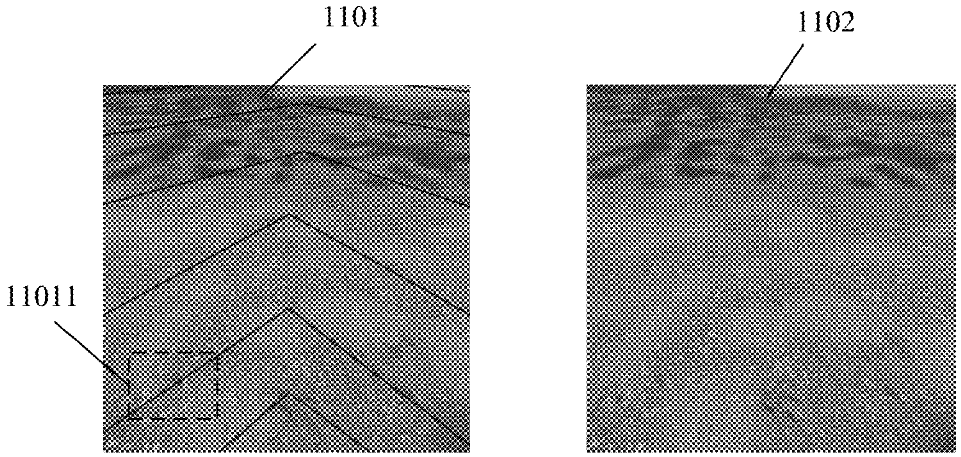
FIG. 11A is an example of a comparison diagram before and after interpolation processing is performed on a rendering image.
Figure 11B:
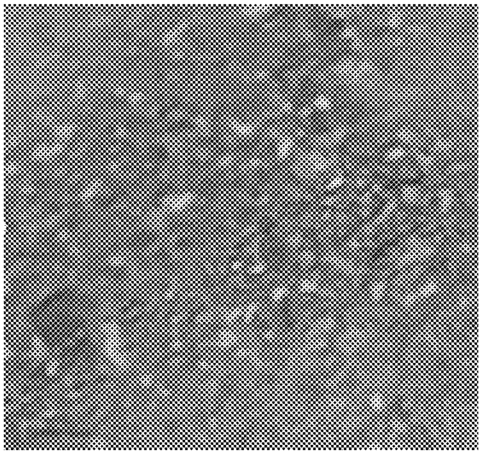
FIG. 11B is an example of a partially enlarged schematic diagram of a terrain image before interpolation processing.

FIG. 11A is a comparison diagram before and after interpolation processing is performed on a rendering image. Rendering image 1101 is a rendering image before interpolation processing, rendering image 1102 is the rendering image after the interpolation processing. Black borders in rendering image 1101 are dividing lines at different levels. FIG. 11B is a partially enlarged schematic diagram of a terrain image before interpolation processing. FIG. 11B is an enlarged image of an area 11011 near the dividing line of a level 1 and a level 2 in FIG. 11A. In FIG. 11B, an upper left part is a coverage range of the level 2, and a lower right part is a coverage range of the level 1. The level 1 and the level 2 have a clear image precision difference by comparing the two different coverage ranges.

In one example, height information and normal information of a vertex may be stored in one picture. The normal information of the vertex may be compressed and stored, to occupy only two channels. In this way, the height information (16 bytes occupy two channels) may be merged to occupy a 32-bit color value. In this way, during use, a height of the vertex of the terrain and a normal of the vertex can be obtained at the same time by sampling once.

Figure 12:
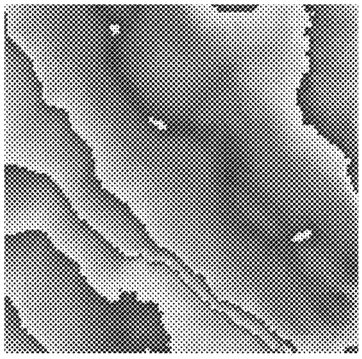
FIG. 12 is a schematic diagram of an example of a normal height map.

A height map sample height value may be stored on an RG channel of a color, and a normal map sample may be compressed and stored on a BA channel, occupying exactly four channels of a color value, and the normal map may be outputted into a picture shown in FIG. 12.

In addition, to avoid a problem of vertical UV stretching, in one example, a normal of each pixel point of a current rock model may be reversely directed, and then the normal may be multiplied by the height difference, to obtain an adjustment coordinates. Then, an overlay operation may be performed on the adjustment coordinates and the world coordinates of the pixel points in current rock coordinates, to obtain adjusted world coordinates. Finally, an image set may be sampled by using the adjusted world coordinates. In this way, inner offsetting of the model can be implemented to sample the image set, so that the problem of vertical UV stretching is avoided.

Figure 13:
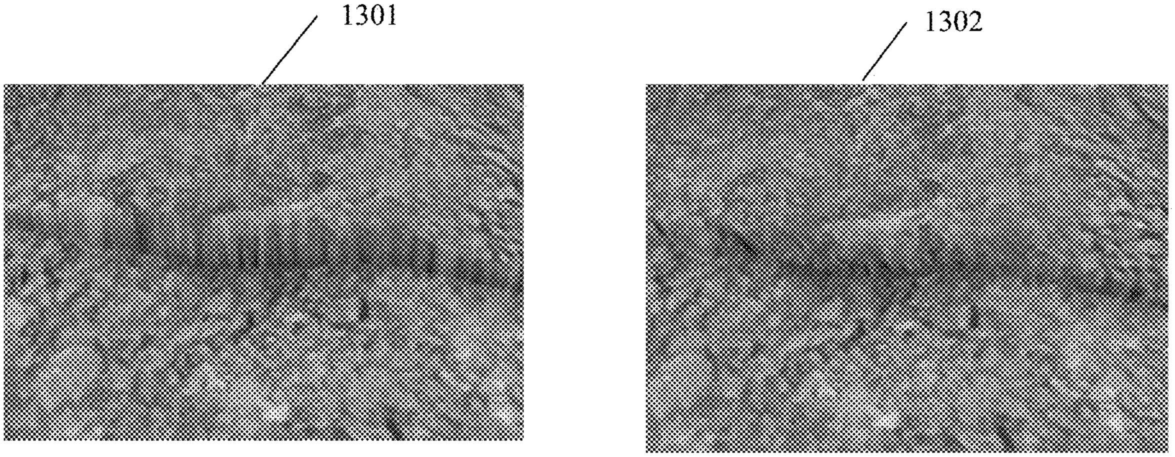
FIG. 13 is a comparison schematic diagram of an example of a facade restoration according to one or more aspects of this application.

FIG. 13 is a comparison schematic diagram of facade restoration according to one or more aspects of this application. Rendering map 1301 in FIG. 13 is a rock rendering map without repairing a steep surface facade stretching problem. Rendering map 1302 in FIG. 13 is a rock rendering map with a repaired steep surface facade stretching problem. It can be seen that no stretching problem occurs in a pixel point on a repaired steep surface by comparing rendering maps 1301 and 1302.

Figure 14:
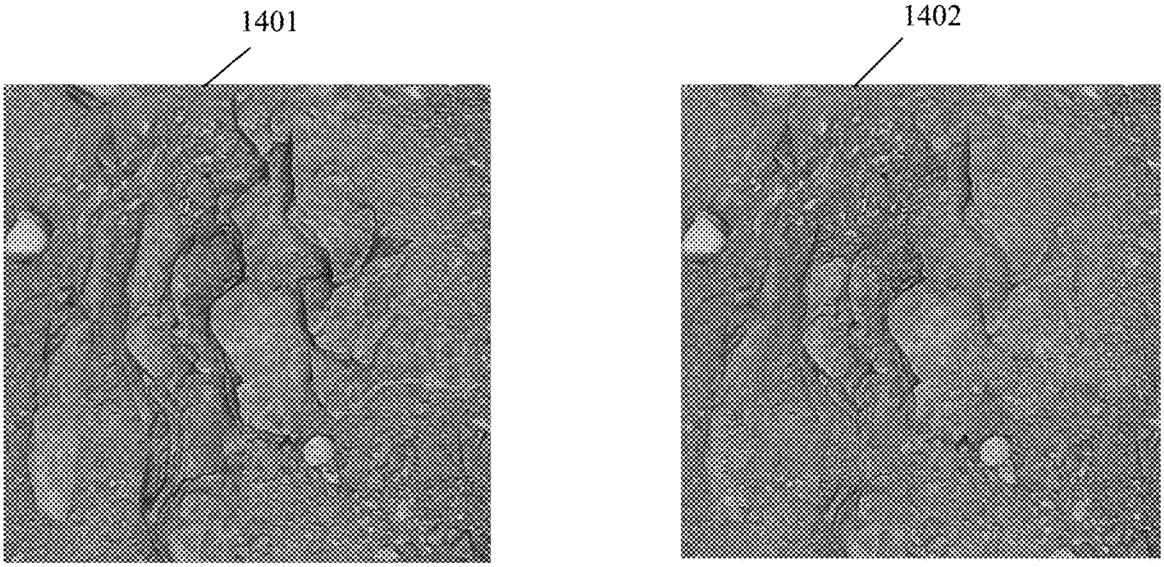
FIG. 14 is a schematic diagram of an example of a comparison between terrain images before and after smooth transition processing is performed according to one or more aspects of this application.

During terrain rendering, a rock model may also sample a pixel value in an image set through world coordinate conversion. Then, a terrain height map may be sampled, to obtain a height difference between the ground and the current rock model. In addition, a blending weight for blending a rock color and a surface color may be determined based on the height difference between the ground and the current rock model. A smaller height difference indicates a larger blending weight. FIG. 14 is an example of a schematic diagram of comparison between terrain images before and after smooth transition processing is performed according to one or more aspects of this application. In FIG. 14, image 1401 is a terrain image on which smooth transition processing is not performed, and image 1402 is a terrain image after the smooth transition processing. It can be seen by comparing images 1401 and 1402 that after the smooth transition processing, a part at which a rock connects a surface is smoother before the transition processing.

The method for rendering the terrain provided in the one or more aspects of this application may be configured for texture rendering, and may also be configured for shadow rendering. Therefore, performance is improved, and real-time rendering overhead is reduced. In addition, when the image set is generated, an organization manner of the color channel is not limited to the manner provided in the one or more aspects of this application. There may be 1 to N different image sets to store different information based on item requirements.

Through the method for rendering the terrain provided in the one or more aspects of this application, a person of the art may use richer map resources when making the terrain. Therefore, a quantity of uses is not limited due to performance (a splat map blending solution in a commercial engine is limited due to the performance, and generally only the surface material in four levels is suggested to be used), so that a fusion effect between a scene object and the surface may be implemented, and scene realism is enhanced. For example, a model such as a rock and a tree root may seamlessly transition with the surface, and it is more natural and consistent. In addition, a decal effect and a road may be pre-baked into a terrain image set, to further reduce real-time rendering pressure and improve overall performance.

The following continues to describe an exemplary structure in which implementation of an apparatus 455 for rendering a terrain image provided in the one or more aspects of this application is a software module. In some instances, as shown in FIG. 3, the software module in the apparatus 455 for rendering the terrain image stored in a memory 450 may include:

a first determining module 4551, configured to determine, in response to determining that refresh timing of a terrain image is reached, a to-be-refreshed target level and surface range information that needs to be refreshed; a first obtaining module 4552, configured to obtain level area images corresponding to the target level from a pre-generated image set respectively, the image set including at least two map images, each map image including a plurality of level area images that are generated using a clipmap rendering process and that are of different levels of detail; a first updating module S553, configured to update the level area image corresponding to the target level based on the surface range information, to obtain an updated level area image corresponding to the target level, and update the image set based on the updated level area image corresponding to the target level, to obtain an updated image set; a second determining module 4454, configured to determine rendering information of each pixel point in a visual range based on the updated image set; and a first rendering module 4455, configured to render a terrain image in the visual range based on the rendering information of each pixel point.

In some instances, the apparatus may further include: a second obtaining module, configured to obtain, when it is detected that a virtual object moves in a virtual scene, a movement distance of the virtual object and size information corresponding to each level of detail; a third determining module, configured to determine a ratio of the movement distance to the size information corresponding to each level of detail; and a fourth determining module, configured to determine, when it is determined that a level of detail whose ratio is greater than a preset ratio threshold exists, that the refresh timing of the terrain image is reached.

In some instances, the first determining module may be further configured to determine the level of detail whose ratio is greater than the ratio threshold as the to-be-refreshed target level; obtain, based on the movement direction, the movement distance, and size information of the target level, a movement direction of the virtual object; and determine the surface range information that needs to be refreshed.

In some instances, the first updating module may be further configured to perform offset processing on the level area image corresponding to the target level based on the movement direction and the movement distance of the virtual object, to obtain an offset level area image; store the offset level area image as a temporary image, a size of the temporary image being the same as a size of the level area image of the target level; determine a supplementary map image corresponding to the surface range information that needs to be refreshed; and add the supplementary map image to the temporary image, to obtain the updated level area image corresponding to the target level.

In some instances, the image set may include a color map image, a normal height map image, and a material map image, the updated level area image corresponding to the target level correspondingly including an updated color level area image corresponding to the target level, an updated normal height level area image corresponding to the target level, and an updated material level area image corresponding to the target level. The first updating module may be further configured to: replace an original color level area image corresponding to the target level in the color map image with the updated color level area image, to obtain an updated color map image; replace an original normal height level area image corresponding to the target level in the normal height map image with the updated normal height level area image, to obtain an updated normal height map image; replace an original material level area image corresponding to the target level in the material map image with the updated material level area image, to obtain an updated material map image; and determine the updated color map image, the updated normal height map image, and the updated material map image as an updated image set.

In some instances, the apparatus may further include: a third obtaining module, configured to obtain a pre-generated first splat map and a plurality of to-be-blended surface texture images corresponding to each level of detail; a first fusion module, configured to perform fusion processing on the plurality of surface texture images corresponding to each level of detail based on the first splat map, to obtain a fused surface texture image corresponding to each level of detail, fused surface texture images corresponding to different levels of detail having a same size, but having different coverage ranges; and a first composing module, configured to perform composition processing on the fused surface texture images corresponding to the levels of detail, to obtain the color map image.

In some instances, the apparatus may further include: a fourth obtaining module, configured to obtain normal information of each pixel point in a coverage range corresponding to each level of detail, and compress the normal information, to obtain compressed normal information; a fifth obtaining module, configured to obtain height information of each pixel point in the coverage range corresponding to each level of detail; a first generation module, configured to generate a normal height map corresponding to each level of detail based on the compressed normal information and the height information of each pixel point in the coverage range corresponding to each level of detail; and a second composing module, configured to perform composition processing on the normal height maps corresponding to the levels of detail, to obtain the normal height map image.

In some instances, the second determining module may be further configured to obtain world coordinates of each pixel point in the visual range; determine texture mapping coordinates of each pixel point based on the world coordinates of each pixel point; and determine, based on the texture mapping coordinates of each pixel point, the rendering information of each pixel point from the updated image set.

In some instances, the second determining module may be further configured to obtain a level of detail at which each pixel point is located and center coordinates of a center position of the level of detail; determine a distance between each pixel point and the center position based on the texture mapping coordinates of each pixel point and the center coordinates; and determine, when a distance corresponding to an it pixel point is less than a preset distance threshold, pixel values corresponding to texture mapping coordinates of the $i^{th}$ pixel point in the updated image set as rendering information of the $i^{th}$ pixel point, i=1, 2, . . . , N, with N being a total quantity of pixel points, and a positive integer greater than 2.

In some instances, the second determining module may be further configured to determine a coordinate updating weight based on the distance when the distance corresponding to the $i^{th}$ pixel point is greater than or equal to the distance threshold; determine, in response to that the coordinate updating weight is greater than a weight threshold, a target pixel point of the $i^{th}$ pixel point from a next level of a level of detail at which the $i^{th}$ pixel point is located, the target pixel point and the $i^{th}$ pixel point having same world coordinates; and determine pixel values of the target pixel point in the updated image set as the rendering information of the $i^{th}$ pixel point.

In some instances, the apparatus may further include: a sixth obtaining module, configured to obtain a model identifier of a to-be-rendered model, and obtain a map image corresponding to another model when it is determined, based on the model identifier, that the to-be-rendered model is the another model above a surface; a seventh obtaining module, configured to obtain normal information of each pixel point on the another model, and perform reverse processing on the normal information of each pixel point, to obtain reverse normal information; a fifth determining module, configured to determine a height difference between each pixel point and the surface, and determine products of the reverse normal information and the height difference corresponding to each pixel point as adjustment coordinates; a first adjustment module, configured to adjust the world coordinates of each pixel point by using the adjustment coordinates, to obtain adjusted world coordinates of each pixel point; and a sixth determining module, configured to determine the rendering information of each pixel point based on the adjusted world coordinates of each pixel point.

In some instances, the apparatus may further include: a seventh determining module, configured to determine a blending weight corresponding to each pixel point based on the height difference after rendering information of the another model above the surface is determined; a seventh obtaining module, configured to obtain a surface reference pixel point corresponding to each pixel point and the rendering information of the surface reference pixel point; a fusion module, configured to perform fusion processing on the rendering information of each pixel point and the rendering information of the surface reference pixel point corresponding to each pixel point based on the blending weight corresponding to each pixel point, to obtain fused rendering information; and a second updating module, configured to update the fused rendering information as the rendering information of each pixel point.

The descriptions of the apparatus for rendering the terrain image in the one or more aspects of this application are similar to the descriptions of the foregoing method aspects, and have a same beneficial effect to the method aspects. For technical details not disclosed in the apparatus aspects, refer to the methods for rendering terrain discussed above.

One or more aspects of this application provide a computer program product or a computer program, the computer program product or the computer program including computer instructions, and the computer instructions being stored in a computer-readable storage medium. A processor of an electronic device reads the computer instructions from the computer-readable storage medium, and the processor executes the computer instructions, so that the electronic device performs the method for rendering the terrain image provided in the one or more aspects of this application.

One or more aspects of this application provide a non-transitory computer-readable storage medium of executable instructions, having the executable instructions stored therein. When the executable instructions are executed by a processor, the processor may perform the method for rendering the terrain image provided in the one or more aspects of this application, for example, the method for rendering the terrain image shown in FIG. 4, FIG. 5, and FIG. 6.

In some instances, the computer-readable storage medium may be a memory such as an FRAM, a ROM, a PROM, an EPROM, an EEPROM, a flash memory, a magnetic surface memory, an optical disc, or a CD-ROM, or may be various devices including one or any combination of the memories.

In some instances, the executable instructions may be written in any form of programming language (including a compiled or interpreted language, or a declarative or procedural language) in a form of a program, software, a software module, a script, or code, and may be deployed in any form, including being deployed as an independent program or being deployed as a module, a component, a subroutine, or another unit applicable for use in a computing environment.

For example, the executable instructions may, but do not necessarily correspond to a file in a file system, and may be stored as a part of a file that saves another program or data, for example, stored in one or more scripts in a hyper text markup language (HTML) file, stored in a single file dedicated to a program in discussion, or stored in a plurality of collaborative files (for example, files that store one or more modules, subprograms, or code parts).

For example, the executable instructions may be deployed to be executed on one computer device, or executed on a plurality of computer devices located at one location, or executed on a plurality of computer devices that are distributed in a plurality of locations and interconnected by a communication network.

The foregoing descriptions described above are merely examples of the one or more aspects of this application, and this is not intended to limit the protection scope of this application. Any modification, equivalent replacement, and improvement made within the spirit and scope of this application shall fall within the protection scope of this application.

What is claimed is:

1. A method comprising:

obtaining, by a computing device and based on detecting that a virtual object has moved in a virtual scene, a movement distance of the virtual object and size information corresponding to each different level of detail;

determining, by the computing device, a ratio of the movement distance to the size information corresponding to each different level of detail;

determining, by the computing device and when it is determined that a level of detail of the different levels of detail has a ratio greater than a preset ratio threshold, that a refresh timing of a terrain image in the virtual scene is reached;

determining, by the computing device and in response to the determination that the refresh timing of the terrain image in the virtual scene is reached, a target level for a refreshing of the terrain image and surface range information for the refreshing of the terrain image;

obtaining, by the computing device and from a pre-generated image set, a level area image corresponding to the target level, the pre-generated image set comprising at least two map images, and each map image comprising a plurality of level area images that are generated using a clipmap rendering process and that are of different levels of detail;

updating, by the computing device and based on the surface range information, the level area image corresponding to the target level to obtain an updated level area image corresponding to the target level;

updating, by the computing device and based on the updated level area image, the pre-generated image set to obtain an updated image set;

determining, by the computing device and based on the updated image set, rendering information of each pixel point in a visual range; and rendering, by the computing device, the terrain image in the visual range based on the rendering information of each pixel point in the visual range.

2. The method according to claim 1, wherein the determining a target level for the refreshing and surface range information for the refreshing comprises:

determining the level of detail as the target level for the refreshing;

obtaining a movement direction of the virtual object; and determining, based on the movement direction, the movement distance, and size information of the target level, the surface range information for the refreshing.

3. The method according to claim 2, wherein the updating the level area image comprises:

performing offset processing on the level area image corresponding to the target level for the refreshing based on the movement direction and the movement distance of the virtual object, to obtain an offset level area image;

storing the offset level area image as a temporary image, a size of the temporary image being the same as a size of the level area image of the target level;

determining a supplementary map image corresponding to the surface range information for the refreshing; and adding the supplementary map image to the temporary image, to obtain the updated level area image corresponding to the target level.

4. The method according to claim 3, wherein:

the pre-generated image set comprises a color map image, a normal height map image, and a material map image, the updated level area image corresponding to the target level comprises an updated color level area image corresponding to the target level, an updated normal height level area image corresponding to the target level, and an updated material level area image corresponding to the target level, and the updating the pre-generated image set based on the updated level area image corresponding to the target level, to obtain an updated image set comprises:

replacing an original color level area image corresponding to the target level in the color map image with the updated color level area image, to obtain an updated color map image;

replacing an original normal height level area image corresponding to the target level in the normal height map image with the updated normal height level area image, to obtain an updated normal height map image;

replacing an original material level area image corresponding to the target level in the material map image with the updated material level area image, to obtain an updated material map image; and determining the updated color map image, the updated normal height map image, and the updated material map image as the updated image set.

5. The method according to claim 4, wherein the method further comprises:

obtaining a pre-generated first splat map and a plurality of to-be-blended surface texture images, each to-be-blended surface texture image of the plurality of to-be-blended surface texture images corresponding to a different level of detail;

performing fusion processing on the plurality of to-be-blended surface texture images based on the pre-generated first splat map, to obtain a plurality of fused surface texture images that each correspond to a different level of detail, the fused surface texture images having a same size and having different coverage ranges; and performing composition processing on the plurality of fused surface texture images to obtain the color map image.

6. The method according to claim 4, wherein the method further comprises:

obtaining normal information of each pixel point in a coverage range corresponding to each level of detail;

compressing the normal information, to obtain compressed normal information;

obtaining height information of each pixel point in the coverage range corresponding to each level of detail;

generating a plurality of normal height maps, each corresponding to a different level of detail, based on the compressed normal information and the height information of each pixel point in the coverage range corresponding to each level of detail; and performing composition processing on the plurality of normal height maps to obtain the normal height map image.

7. The method according to claim 1, wherein the determining rendering information of each pixel point in a visual range based on the updated image set comprises:

obtaining world coordinates of each pixel point in the visual range;

determining texture mapping coordinates of each pixel point based on the world coordinates of each pixel point; and determining, based on the texture mapping coordinates of each pixel point, the rendering information of each pixel point from the updated image set.

8. The method according to claim 7, wherein the determining, based on the texture mapping coordinates of each pixel point, the rendering information of each pixel point from the updated image set comprises:

obtaining a level of detail at which each pixel point is located and center coordinates of a center position of the level of detail;

determining a distance between each pixel point and the center position based on the texture mapping coordinates of each pixel point and the center coordinates; and determining, when a distance corresponding to an $i^{th}$ pixel point is less than a preset distance threshold, pixel values corresponding to texture mapping coordinates of the $i^{th}$ pixel point in the updated image set as rendering information of the $i^{th}$ pixel point, i=1, 2, . . . , N, N being a total quantity of pixel points, and N being a positive integer greater than 2.

9. The method according to claim 8, wherein the determining, based on the texture mapping coordinates of each pixel point, the rendering information of each pixel point from the updated image set comprises:

determining a coordinate updating weight based on the distance when the distance corresponding to the $i^{th}$ pixel point is greater than or equal to the preset distance threshold;

determining, in response to that the coordinate updating weight is greater than a weight threshold, a target pixel point of the $i^{th}$ pixel point from a next level of a level of detail at which the $i^{th}$ pixel point is located, the target pixel point and the $i^{th}$ pixel point having same world coordinates; and determining pixel values of the target pixel point in the updated image set as the rendering information of the $i^{th}$ pixel point.

10. The method according to claim 7, wherein the method further comprises:

obtaining a model identifier of a to-be-rendered model;

obtaining a map image corresponding to another model when it is determined, based on the model identifier, that the to-be-rendered model is the another model above a surface;

obtaining normal information of each pixel point on the another model;

performing reverse processing on the normal information of each pixel point, to obtain reverse normal information;

determining a height difference between each pixel point and the surface;

determining products of the reverse normal information and the height difference corresponding to each pixel point as adjustment coordinates;

adjusting the world coordinates of each pixel point by using the adjustment coordinates, to obtain adjusted world coordinates of each pixel point; and determining the rendering information of each pixel point based on the adjusted world coordinates of each pixel point.

11. The method according to claim 10, wherein the method further comprises:

determining a blending weight corresponding to each pixel point based on the height difference after rendering information of the another model is determined;

obtaining a surface reference pixel point corresponding to each pixel point and rendering information of each surface reference pixel point;

performing fusion processing on the rendering information of each pixel point and the rendering information of the surface reference pixel point corresponding to each pixel point based on the blending weight, to obtain fused rendering information; and updating the fused rendering information as the rendering information of each pixel point.

12. An apparatus comprising:

one or more processors; and memory storing computer-readable instructions which, when executed by the one or more processors, cause the apparatus to:

obtain, based on detecting that a virtual object has moved in a virtual scene, a movement distance of the virtual object and size information corresponding to each different level of detail;

determine a ratio of the movement distance to the size information corresponding to each different level of detail;

determine, when it is determined that a level of detail of the different levels of detail has a ratio greater than a preset ratio threshold, that a refresh timing of a terrain image in the virtual scene is reached;

determine, in response to the determination that the refresh timing of the terrain image in the virtual scene is reached, a target level for a refreshing of the terrain image and surface range information for the refreshing of the terrain image;

obtain, from a pre-generated image set, a level area image corresponding to the target level, the pre-generated image set comprising at least two map images, and each map image comprising a plurality of level area images that are generated using a clipmap rendering process and that are of different levels of detail;

update, based on the surface range information, the level area image corresponding to the target level to obtain an updated level area image corresponding to the target level;

update, based on the updated level area image, the pre-generated image set to obtain an updated image set;

determine, based on the updated image set, rendering information of each pixel point in a visual range; and render the terrain image in the visual range based on the rendering information of each pixel point in the visual range.

13. The apparatus according to claim 12, wherein the determining a target level for the refreshing and surface range information for the refreshing comprises:

determining the level of detail as the target level for the refreshing;

obtaining a movement direction of the virtual object; and determining, based on the movement direction, the movement distance, and size information of the target level, the surface range information for the refreshing.

14. The apparatus according to claim 13, wherein the updating the level area image comprises:

performing offset processing on the level area image corresponding to the target level for the refreshing based on the movement direction and the movement distance of the virtual object, to obtain an offset level area image;

storing the offset level area image as a temporary image, a size of the temporary image being the same as a size of the level area image of the target level;

determining a supplementary map image corresponding to the surface range information for the refreshing; and adding the supplementary map image to the temporary image, to obtain the updated level area image corresponding to the target level.

15. A non-transitory computer-readable media storing instructions which, when executed by a computing device, cause the computing device to:

obtain, based on detecting that a virtual object has moved in a virtual scene, a movement distance of the virtual object and size information corresponding to each different level of detail;

determine a ratio of the movement distance to the size information corresponding to each different level of detail;

determine, when it is determined that a level of detail of the different levels of detail has a ratio greater than a preset ratio threshold, that a refresh timing of a terrain image in the virtual scene is reached;

determine, in response to the determination that the refresh timing of the terrain image in the virtual scene is reached, a target level for a refreshing of the terrain image and surface range information for the refreshing of the terrain image;

obtain, from a pre-generated image set, a level area image corresponding to the target level, the pre-generated image set comprising at least two map images, and each map image comprising a plurality of level area images that are generated using a clipmap rendering process and that are of different levels of detail;

update, based on the surface range information, the level area image corresponding to the target level to obtain an updated level area image corresponding to the target level;

update, based on the updated level area image, the pre-generated image set to obtain an updated image set;

determine, based on the updated image set, rendering information of each pixel point in a visual range; and render the terrain image in the visual range based on the rendering information of each pixel point in the visual range.

16. The non-transitory computer-readable media according to claim 15, wherein the determining a target level for the refreshing and surface range information for the refreshing comprises:

determining the level of detail as the target level for the refreshing;

obtaining a movement direction of the virtual object; and determining, based on the movement direction, the movement distance, and size information of the target level, the surface range information for the refreshing.

17. The non-transitory computer-readable media according to claim 16, wherein the updating the level area image comprises:

performing offset processing on the level area image corresponding to the target level for the refreshing based on the movement direction and the movement distance of the virtual object, to obtain an offset level area image;

storing the offset level area image as a temporary image, a size of the temporary image being the same as a size of the level area image of the target level;

determining a supplementary map image corresponding to the surface range information for the refreshing; and adding the supplementary map image to the temporary image, to obtain the updated level area image corresponding to the target level.

* * * * *